(12) United States Patent
Ha et al.

(10) Patent No.: US 9,871,710 B2
(45) Date of Patent: Jan. 16, 2018

(54) ELECTRONIC DEVICE FOR OPERATING APPLICATION

(71) Applicant: Samsung Electronics Co., Ltd., Suwon-si, Gyeonggi-do (KR)

(72) Inventors: Suhyung Ha, Suwon-si (KR); Geonsoo Kim, Suwon-si (KR); Seungpyo Hong, Seoul (KR); Huichul Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 14/276,338

(22) Filed: May 13, 2014

(65) Prior Publication Data

US 2014/0344448 A1    Nov. 20, 2014

(30) Foreign Application Priority Data

May 20, 2013    (KR) ........................ 10-2013-0056463

(51) Int. Cl.
| | |
|---|---|
| *G06F 15/16* | (2006.01) |
| *G06F 15/173* | (2006.01) |
| *H04L 12/26* | (2006.01) |
| *G06F 9/445* | (2006.01) |

(52) U.S. Cl.
CPC ...... *H04L 43/0876* (2013.01); *G06F 9/44505* (2013.01)

(58) Field of Classification Search
CPC .......................... H04L 43/0876; G06F 9/44505
USPC ................................ 709/201–203, 223–226
See application file for complete search history.

(56) References Cited

U.S. PATENT DOCUMENTS

| | | | | |
|---|---|---|---|---|
| 9,223,564 | B2 * | 12/2015 | Munireddy | G06F 8/665 |
| 2002/0069282 | A1 * | 6/2002 | Reisman | G06F 8/65 |
| | | | | 709/227 |
| 2008/0134165 | A1 * | 6/2008 | Anderson | G06F 8/65 |
| | | | | 717/173 |
| 2009/0017812 | A1 * | 1/2009 | Chan | G06F 8/62 |
| | | | | 455/419 |
| 2009/0156200 | A1 * | 6/2009 | Ishii | G06F 11/0742 |
| | | | | 455/425 |
| 2009/0187901 | A1 * | 7/2009 | Kanai | G06F 8/65 |
| | | | | 717/173 |

(Continued)

FOREIGN PATENT DOCUMENTS

KR    2011-0052457 A    5/2011

OTHER PUBLICATIONS

Lizhou et al., "A Framework for Live Software Upgrade", Proceedings of the 13th International Symposium on Software Reliability Engineering (ISSRE'02), Nov. 12-15, 2022, pp. 149-158.

(Continued)

*Primary Examiner* — Minh-Chau Nguyen
(74) *Attorney, Agent, or Firm* — Jefferson IP Law, LLP

(57) ABSTRACT

A method of operating an electronic device is provided. The method includes detecting an execution request of an application installed in the electronic device, determining, in response to the execution request, whether an external device connected to the electronic device has a replacement application, and transmitting an execution request of the replacement application to the external device if the external device is determined to have the replacement application.

18 Claims, 16 Drawing Sheets

(56) References Cited

U.S. PATENT DOCUMENTS

| | | | |
|---|---|---|---|
| 2010/0042733 A1* | 2/2010 | Jeffrey | H04M 1/72527 709/228 |
| 2011/0109613 A1* | 5/2011 | Asai | G06F 1/28 455/566 |
| 2011/0112819 A1 | 5/2011 | Shirai et al. | |
| 2012/0054320 A1* | 3/2012 | Yoshida | G06F 3/04886 709/219 |
| 2012/0250858 A1* | 10/2012 | Iqbal | H04L 9/0861 709/203 |
| 2014/0196023 A1* | 7/2014 | Bouthillier | G06F 8/61 717/178 |

OTHER PUBLICATIONS

Klein et al., "Publisher Framework (PFW)", ADA Letters, Aug. 2006, pp. 12-22, vol. 25—No. 2.

* cited by examiner

ELECTRONIC DEVICE FOR OPERATING APPLICATION

CROSS-REFERENCE TO RELATED APPLICATION(S)

This application claims the benefit under 35 U.S.C. § 119(a) of a Korean patent application filed on May 20, 2013 in the Korean Intellectual Property Office and assigned Serial number 10-2013-0056463, the entire disclosure of which is hereby incorporated by reference.

TECHNICAL FIELD

The present disclosure relates to an operation of an electronic device. More particularly, the present disclosure relates to an operation of an Application (APP) of an electronic device.

BACKGROUND

In recent years, electronic devices have supported complex operations of various user functions based on the development of hardware technologies. The electronic devices are connected with each other so that they can operate applications installed in counterpart devices. When an application executed in a first electronic device is executed in a second electronic device, data related to the application may be output to the second electronic device from the first electronic device. Thereafter, the second electronic device may display the data related to the application.

The above information is presented as background information only to assist with an understanding of the present disclosure. No determination has been made, and no assertion is made, as to whether any of the above might be applicable as prior art with regard to the present disclosure.

SUMMARY

However, if the second electronic device is superior to the first electronic device in terms of screen and capability, advantages of the second electronic device may not be properly used. Particularly, when data (e.g., a webpage) related to a web browser is moved to the second electronic device from the first electronic device, only a simple function which is not beyond a user's request is provided without a consideration of the utilization of the web browser.

Aspects of the present disclosure are to address at least the above-mentioned problems and/or disadvantages and to provide at least the advantages described below. Accordingly, an aspect of the present disclosure is to provide a method and an apparatus for operating an application through the use of a plurality of electronic devices.

In accordance with an aspect of the present disclosure, a method of operating an electronic device is provided. The method includes detecting an execution request of an application installed in the electronic device, determining, in response to the execution request, whether an external device connected to the electronic device has a replacement application, and transmitting an execution request of the replacement application to the external device if the external device is determined to have the replacement application.

In accordance with another aspect of the present disclosure, a method of operating an electronic device having applications installed therein is provided. The method includes receiving execution information from an external device, selecting one or more of the applications according to the execution information, executing the selected application according to the execution information, and outputting a result according to the execution.

In accordance with another aspect of the present disclosure, an electronic device is provided. The electronic device includes an input unit, a storage unit configured to store an application, a connector configured to connect with an external device, and a controller configured to control the storage unit and the connector, wherein the controller detects an execution request of the application from the input unit, determines, in response to the execution request, whether the external device has a replacement application, and controls to the connector to transmit an execution request of the replacement application to the external device if the external device is determined to have the replacement application.

In accordance with another aspect of the present disclosure, an electronic device is provided. The electronic device includes an input unit, an connector configured to connect with an external device, a memory configured to store a supporting program controlling an application and the external device, and a processor configured to access the memory to execute the program, wherein the supporting program is set to perform a function of detecting an execution request of the application from the input unit, an operation of determining whether the external device has a replacement application in response to the execution request, and an operation of transmitting an execution request of the replacement application to the external device when the external device is determined to have the replacement application.

According to an electronic device and a method of operating the same according to the present disclosure, an application can be operated using a plurality of electronic devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
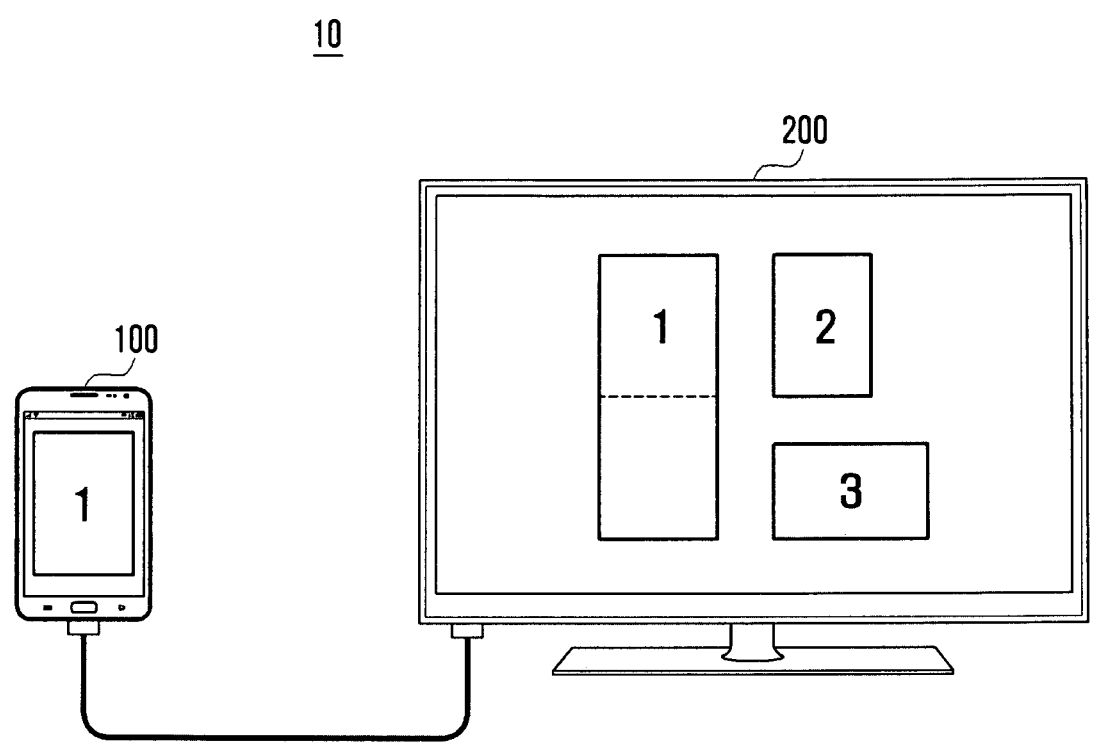
FIG. 1 schematically illustrates a configuration of an Application (APP) operating system supporting an APP operation according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some configuration elements may be exaggerated, omitted, or schematically shown, and a size of each element may not precisely reflect the actual size. Accordingly, the present disclosure is not restricted by a relative size or interval shown in the accompanying drawings.

In the following description, an electronic device may include, for example, a smart phone, a mobile phone, a video phone, an e-book reader, tablet Personal Computer (PC), a desktop PC, a laptop PC, a notebook PC, a Digital Camera, a Smart Television (TV), a Personal Digital Assistant (PDA), an Electronic Scheduler, a Desktop PC, a Portable Multimedia Player (PMP), a Media Player (e.g., MP3 player), Audio Equipment, a Smart Watch, a Terminal for a game, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, electronic devices may be classified into different types of devices. For example, a first electronic device may be a smart phone and a second electronic device may be a smart TV. Of course, hereinafter the electronic devices may be classified into the same types of devices. The electronic devices may be divided into the same types of devices but may have different capabilities. For example, the first electronic device and the second electronic device may all be classified as the smart phone, but the second electronic device may have a larger screen in comparison with the first electronic device. Further, the second electronic device may have a faster processing speed of a Central Processing Unit (CPU) in comparison with the first electronic device. Hereinafter the electronic devices may have different components included therein. For example, the first electronic device includes a mobile communication module, but the second electronic device may not include the mobile communication module.

FIG. 1 schematically illustrates a configuration of an Application (APP) operating system supporting an application operation according to an embodiment of the present disclosure.

Referring to FIG. 1, an APP operating system 10 may include a first electronic device 100 and a second electronic device 200. One of the first electronic device 100 and the second electronic device 200 is used as an APP operating device and the other is used as an APP output device. According to various embodiments of the present disclosure, one of the first electronic device 100 and the second electronic device 200 is used as an APP operating device and the other is used as an APP output device in relation to a first APP, and the other of the one of the first electronic device 100 and the second electronic device 200 is used as an APP operating device and the other is used as an APP output device in relation to a second APP. According to various embodiments of the present disclosure, an electronic device may concurrently operate as an APP operating device and an APP output device in relation to another electronic device and/or various APPs. Hereinafter it is assumed that the first electronic device 100 is used as the APP operating device and the second electronic device 200 is used as the APP output device.

The APP operating system 10 may make support such that APP data (e.g., a result to be output through a display unit according to an APP execution (e.g., a web page)) of an application (hereinafter referred to as an "APP") executed in the first electronic device 100 is output through the second electronic device 200. For example, if five APPs are assumed to be executed in the first electronic device 100, data of at least one of the five APPs may be output through the second electronic device 200. The first electronic device 100 may operate the APP in an execution state. Further, the first electronic device 100 may operate the APP in an activation state.

The execution state may include at least one of a state in which the first electronic device 100 runs a corresponding APP according to a user input (e.g., a touch input of a touch input means (e.g., finger, pen, and/or the like) on a screen having a touch panel installed therein) and a state in which a result of an execution of the corresponding APP is provided to the user as feedback. The feedback may include at least one of visual feedback (e.g., a result displayed on the screen), auditory feedback (e.g., music output), and tactile feedback (e.g., vibration). The screen may be a screen of the first electronic device 100, a screen of the second electronic device 200, or screens of the two devices 100 and 200.

The activation state may be a state in which an APP is loaded to a memory and is on standby for an execution or a state in which the APP is loaded to the memory but data of the corresponding APP is not displayed on the screen. Among APPs in the activation state, an APP having a widget function may be changed to an execution state from the activation state according to setting information set to the corresponding APP. Of course, the APPs in the activation state may be changed to the execution state by a user's designation. In the following description, the memory may be a storage device in which information (e.g., data, a file, an application, and/or the like) is written or to which information stored in a storage unit 150 is loaded by the controller. For example, the memory may include Random Access Memory (RAM), and/or the like. Such a memory may serve as a buffer in some contexts.

The first electronic device 100 may store APPs in the storage unit 150 and may activate and execute the corresponding APP according to a user's request (e.g., tapping an APP icon displayed on the screen). Further, when the second electronic device 200 is connected to the first electronic device 100 or when a user's request is detected after the second electronic device 200 is connected to the first electronic device 100, the first electronic device 100 may transmit APP data (e.g., a result according to an execution of the corresponding APP, information for identifying the corresponding APP (e.g., an application name) or the like) to the second electronic device 200. According to various embodiments of the present disclosure, the first electronic device 100 may transmit APP data in response to the second electronic device 200 being connected to the first electronic device 100. In addition, when the APP data is updated by the execution of the APP (e.g., a webpage to be displayed is changed), the first electronic device 100 may transmit the updated APP data to the second electronic device 200.

The first electronic device 100 may execute a particular APP in response to an input signal received from the second electronic device 200 or an input signal input from an input unit 120 included in the first electronic device 100. When the APP data is updated during an execution process, the APP operating device (e.g., the first electronic device 100) may transmit the updated APP data to the second electronic device 200. For example, the APP operating device (e.g., the first electronic device 100) may transmit updated APP data in response to the APP data being updated (e.g., during an execution process). The first electronic device 100 according to various embodiments of the present disclosure will be described in more detailed with reference to FIGS. 2 and 3 described below.

The second electronic device 200 may be connected with the first electronic device 100 through at least one of various wired/wireless communication schemes. The second electronic device 200 may receive APP data from the first electronic device 100 and output the received APP data through a display unit. For example, when the first electronic device 100 provides a plurality of APP data (e.g., APP data corresponding to APPs which are being executed), the second electronic device 200 may classify the APP data and display the classified APP data on APP display areas, respectively. The APP display areas may not overlap each other. To this end, the display unit of the second electronic device 200 may have a relatively wider screen in comparison with the display unit of the first electronic device 100. Of course, the APP display areas may partially overlap each other. Meanwhile, in the following description, the same components of the second electronic device 200 may be called differently from those of the first electronic device 100 in order to avoid confusion. For example, the display unit of the second electronic device 200 may be called a device display unit.

The second electronic device 200 may display an APP display area larger than the APP display area displayed on the first electronic device 100. The second electronic device 200 may provide an expansion area including much more data rather than simply expanding the APP display area of the first electronic device 100. For example, when a list including ten items is output from the first electronic device 100, the second electronic device 200 may output a list including twenty items.

The second electronic device 200 may include a device input unit. The second electronic device 200 may detect a user input through the device input unit and transmit an input signal corresponding to the user input to the first electronic device 100. In response to the input signal, the first electronic device 100 may update APP data and transmit the updated APP data to the second electronic device 200. When receiving the updated APP data, the second electronic device 200 may display the updated APP data on a corresponding APP display area. The second electronic device 200 according to the present disclosure will be described in more detail with reference to FIGS. 4 and 5 described below.

According to various embodiments of the present disclosure, the APP operating system 10 may be configured to support an electronic device to control an APP that resides on another electronic device (e.g., such that an APP of the first electronic device 100 is controlled by the second electronic device 200). For example, the user may freely control the APP of the first electronic device 100 through the second electronic device 200. Meanwhile, in the above description, the APP may be, for example, a dial input APP for a call, a music file or video file reproduction APP, a file editing APP, a broadcast reception function APP, a gallery function APP, a chatting APP, an alarm APP, a calculator APP, a phonebook APP, a schedule APP, a calendar APP, a browser, a contextual-based APP, and/or the like.

Figure 2:
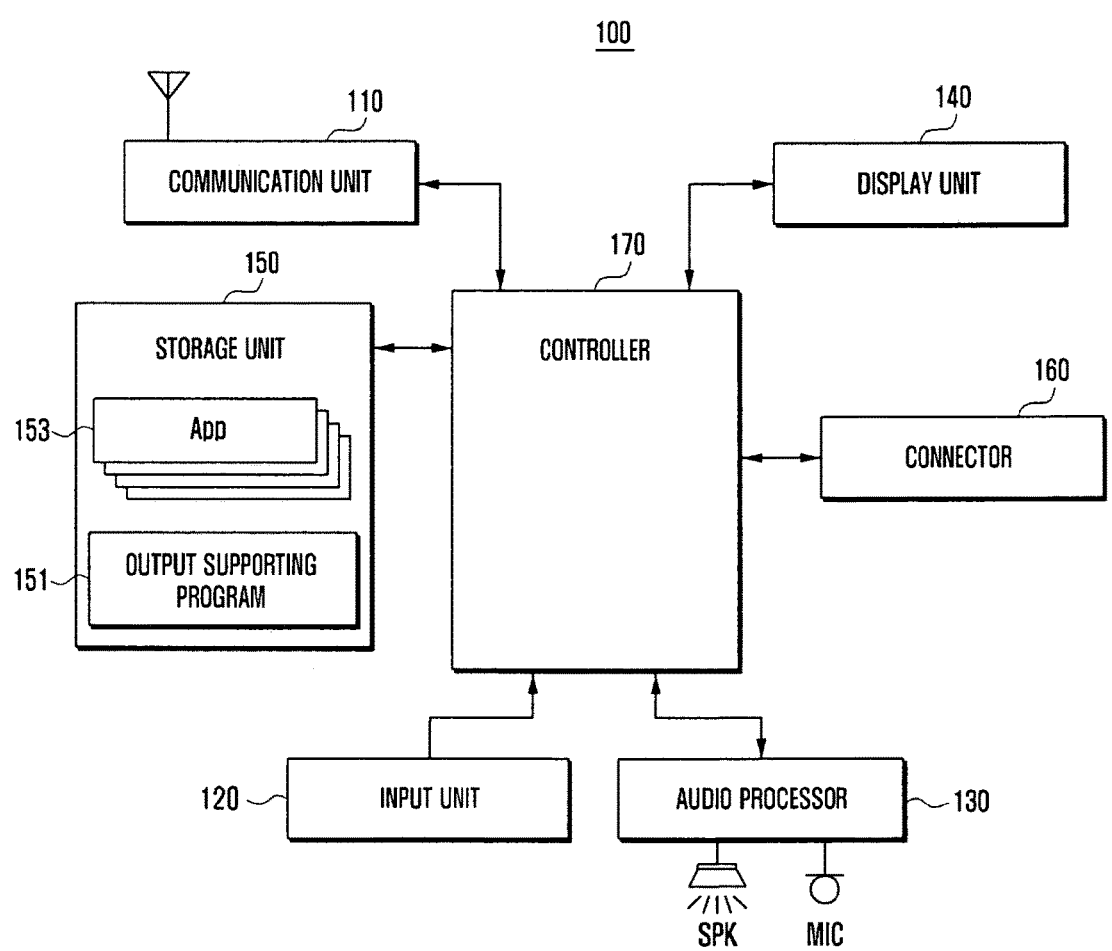
FIG. 2 illustrates a configuration of a first electronic device according to an embodiment of the present disclosure.

FIG. 2 illustrates the configuration of a first electronic device according to an embodiment of the present disclosure in more detail.

Referring to FIG. 2, the first electronic device 100 may include a communication unit 110, an input unit 120, an audio processor 130, a display unit 140, a storage unit 150, a connector 160, and a controller 170. Further, the first electronic device 100 according to the present disclosure may further include an image sensor for collecting images according to a design scheme. In addition, the first electronic device 100 according to the present disclosure may further include various sensors, such as a motion sensor including an acceleration sensor, a proximity sensor, and/or a gyro sensor, and an illumination sensor, as a sensor unit, and/or the like.

The communication unit 110 supports a formation of a communication channel to communicate (e.g., a voice call, a video call, data communication, and/or the like) with an external device through a network under a control of the controller 170. The communication unit 110 may include, for example, a mobile communication module (e.g., a 3-generation module communication module, a 3.5-generation mobile communication module, a 4-generation mobile communication module, and/or the like) and a digital broadcasting module (e.g., a Digital Multimedia Broadcasting (DMB) module). When the communication unit 110 forms a specific communication channel and receives data through the corresponding communication channel, the received data may be provided to the controller 160. The controller 160 may provide the data to the corresponding APP to support an APP operation. The APP data provided for the corresponding APP operation may be provided to the second electronic device 200.

The input unit 120 generates various input signals required for the operation of the first electronic device 100. The input unit 120 may include a keypad, a side key, a home key, and/or the like. As the user presses such a key, an input signal may be generated and the input signal may be transmitted to the controller 170. The controller 170 may control components of the first electronic device 100 in response to the input signal.

Further, the input unit 120 may include a touch panel installed in the screen of the display unit 140 (e.g., a touch screen). The touch panel may be implemented in an add-on type located on the screen of the display unit 140, or an on-cell type or an in-cell type inserted into the display unit 140. Further, the touch panel generates an input signal (e.g., touch event) in response to a gesture (e.g., touch, tap, drag, flick, a hover event, and/or the like) of a touch input means (e.g., finger, pen, and/or the like) on the screen of the display unit 140, A/D (Analog to Digital) converts the generated touch event, and transmits the converted touch event to the controller 170.

The audio processor 130 may be combined with a speaker SPK and a microphone MIC to input and output an audio signal (e.g., voice data) for a voice recognition, a voice recording, a digital recording, and a call. The audio processor 130 may receive an audio signal from the controller 170, D/A-converts the received audio signal to an analog signal, amplifies the analog signal, and then outputs the analog signal to the speaker SPK. The speaker SPK converts an audio signal received from the audio processor 130 to a sound wave and outputs the sound wave. The microphone MIC converts a sound wave transmitted from a human or another sound source to an audio signal. The audio processor 140 A/D-converts an audio signal received from the microphone MIC to a digital signal and then transmits the digital signal to the controller 170.

Meanwhile, when the second electronic device 200 is connected to the connector 160, the audio processor 130 may support an output of a guide sound or an effect sound. Further, when APP data is transmitted to the second electronic device 200, the audio processor 130 may support an output of a guide sound or an effect sound. The support of the output may be omitted according to a designer's intention or a user's selection.

The display unit 140 displays various pieces of information under a control of the controller 170. For example, when the controller 170 processes (e.g., decodes) information and stores the processed information in a buffer of the display unit 140, the display unit 140 converts the data stored in the buffer to an analog signal and display the analog signal on the screen. The display unit 140 may be implemented by a Liquid Crystal Display (LCD), an Active Matrix Organic Light Emitted Diode (AMOLED), a flexible display, a transparent display, and/or the like. Particularly, the display unit 140 may display APP data. The APP data may be displayed on the screen of the display unit 140 according to a setting by the user or a setting of the corresponding APP in one of a landscape mode and a portrait mode.

The storage unit (secondary memory unit) 150 may be implemented by a disc, a RAM, a Read Only Memory (ROM), a flash memory, and/or the like. The storage unit 150 stores data generated according to the operation of the first electronic device 100 or received from an external device through the communication unit 110 or the connector 160 under a control of the controller 170. The memory 150 may include a buffer as a temporary data storage. Of course, the buffer may be separately provided. Further, the storage unit 150 may store various pieces of setting information for setting a use environment of the first electronic device 100.

The storage unit 150 stores a booting program, at least one operating system, and at least one application 153. The operating system serves as an interface between hardware and an application and between applications and manages computer resources, such as a CPU, GPU, a main memory, the storage unit 150, and/or the like. The applications 153 are classified into an embedded application and a 3rd party application. For example, the embedded application may include a web browser, an email program, an instant messenger, and/or the like.

The APPs 153 may be displayed on the screen in a form of an icon or a menu. Further, the APPs 153 may be allocated to a hot key, and/or the like. When the icon, the menu, the hot key, and/or the like is selected by the user (e.g., in response to selection if the icon, the menu, the hotkey, or the like), the corresponding APP may be activated or executed. Further, the APPs 153 may be activated or executed according to a predetermined schedule. In addition, the APPs 153 may include a plurality of APPs for similar functions. For example, the APPs 153 may include a plurality of browser APPs. The plurality of APPs 153 may include a plurality of APPs regarding the camera 170. The plurality of APPs 153 may include APPs for using the second electronic device 200.

According to various embodiments of the present disclosure, the storage unit 150 may store an output supporting program 151. The output supporting program 151 may be an application. Of course, the output supporting program 151 may be a component of the operating system. Further, the output supporting program 151 may be also stored in the second electronic device 200. For example, the second electronic device 200 may be used as the APP operating device.

The output supporting program 151 may be a program supporting a control of the second electronic device 200. Further, the output supporting program 151 may be a program supporting an output of APP data of the APP operated by the first electronic device 100 through the second electronic device 200.

The output supporting program 151 may include a routine loading an APP to a main memory of the controller 170 from the storage unit 150, a routine executing a particular APP among APPs loaded to the main memory, a routine storing execution results in a buffer of the display unit 140, and/or the like. The buffer of the display unit 140 is a storage area allocated to the display unit 140 and may be distinguished from the storage unit 150 and the memory provided for the controller 170. Further, the buffer of the display unit 140 may be referred to as a frame memory or a frame buffer.

The output supporting program 151 may include a routine identifying the existence of a connection of the second electronic device 200, a routine transmitting APP data of some of the activated APPs to the second electronic device 200 according to a setting of the second electronic device 200 (or automatically), and/or the like.

The output supporting program 151 may include a routine receiving an input signal from the input unit 120 or the second electronic device 200, a routine transmitting an input signal to a particular APP (e.g., APP displaying APP data on an uppermost part of the screen), a routine receiving updated APP data from the APP, and a routine outputting the updated APP data to the second electronic device 200.

The output supporting program 151 may include a routine determining an APP to transmit an input signal, a routine transmitting an input signal to the determined APP, a routine receiving updated APP data from the APP, and a routine transmitting the updated APP data to the second electronic device 200.

The output supporting program 151 may include a routine transmitting an input signal generated by the first electronic device 100 to an "APP being executed in the first electronic device 100", a routine transmitting an input signal received from the second electronic device 200 to an "APP outputting APP data to the second electronic device 200, and a routine transmitting a "corresponding APP data to which the input signal of the second electronic device 200 has been applied" to the second electronic device 200 independently from the APP operation of the first electronic device 100.

The output supporting program 151 may include a routine providing APP data to each of the APP output devices. For example, the APP output devices may output the same APP data. The output supporting program 151 may include a routine providing APP data to the APP output devices, respectively. For example, APP data A, B, and C may be output to APP output devices 1, 2, and 3, respectively.

The connector 160 is a component for the connection with the second electronic device 200. For example, a smart TV, a smart monitor, a tablet PC and the like may be connected to the connector 160. The connector 160 may receive APP data from the controller 170 and transmit the APP data to the second electronic device 200, and may receive an input signal from the second electronic device 200 and transmit the input signal to the controller 170.

The connector 160 may support both a wired scheme and a wireless scheme. For example, the connector 160 may include a wired communication module, such as a Universal Serial Bus (USB) interface, a Universal Asynchronous Receiver Transmitter (UART) interface, and/or the like. Further, the connector 160 may include a wireless interface, for example, a short distance communication module, such as a Bluetooth module, a ZigBee module, a Near Field Communication (NFC) module, an Infrared Data Association (IrDA) communication module, a WiFi module, an Ultra WideBand (UWB) module, a Radio Frequency IDentification (RFID) module, an infrared communication module, a Wireless Application Protocol (WAP) module, and/or the like. In addition, the connector 1160 may include a plurality of ports and a plurality of short distance communication modules for connections with a plurality of external devices as well as one external device.

The controller 170 controls general operations of the first electronic device 100 and a signal flow between internal components of the first electronic device 100, performs a function of processing data, and controls power supply to the components from a battery.

The controller 170 may include one or more CPUs. Further, the controller 170 may include a Graphic Processing Unit (GPU). Each of the CPU and the GPU may be integrated into one package in which two or more independent cores (e.g., quad-core) are implemented by a single integrated circuit. For example, the CPUs may be integrated into one multi-core processor. Further, a plurality of GPUs may be integrated into one multi-core processor. The CPU and the GPU may be a System on Chip (SoC). Further, the CPU and the GPU may be packaged as a multi-layer. Meanwhile, an Application Processor (AP) may include the CPU and the GPU. The AP may further include an Image Signal Processor (ISP).

The controller 170 may include a main memory (e.g., main memory unit), for example, a RAM. The main memory stores various loaded programs, for example, a booting program, an operating system, applications, and/or the like. When power of the battery is supplied to the controller 170, the booting program is first loaded to the main memory of the controller 170. The booting program loads the operating system to the main memory. The operating system loads the applications to the main memory. The controller 170 (e.g., AP) may access the main memory to decode a command (routine) of the program and execute a function (e.g., output of APP data) according to a decoding result. For example, the various programs may be loaded to the main memory to run as processes.

Particularly, according to setting information or a user's request, the controller 170 may support a control of a size of the APP display area, a control of a number of APP display areas, a control of a display direction of the APP display area, a control of an update of the APP display area, and a control of the corresponding APP according to an input signal. To this end, the controller 170 may include a configuration as illustrated in FIG. 3.

Figure 3:
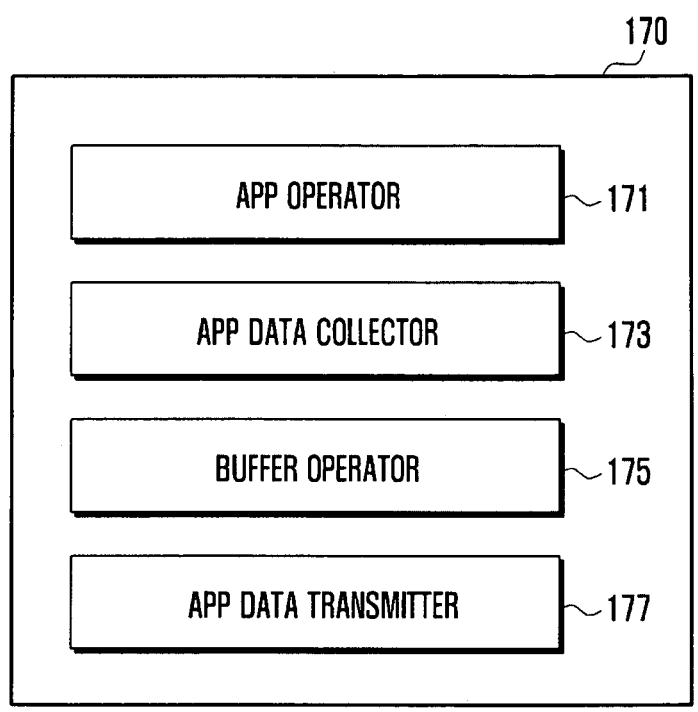
FIG. 3 illustrates a configuration of a controller according to an embodiment of the present disclosure.

FIG. 3 illustrates a configuration of controller according to an embodiment of the present disclosure.

Referring to FIG. 3, the controller 170 may include an APP operator 171, an APP data collector 173, a buffer operator 175, and an APP data transmitter 177.

According to various embodiments of the present disclosure, the APP operator 171 may execute one or more APPs in response to an event generated by the input unit 120 (e.g., a touch event generated by a tap on an APP icon displayed on the screen). According to various embodiments of the present disclosure, the APP operator 171 may execute one or more APPs in response to an event generated according to setting information. According to various embodiments of the present disclosure, the APP operator 171 may execute one or more APPs in response to an event received from the outside through the communication unit 110 or the connector 160. When the corresponding APP is in an inactivation state, the APP operator 171 may load the corresponding APP to the main memory from the storage unit 150, and may then execute the APP. When the corresponding APP is in the activation state, the APP operator 171 may switch the state of the corresponding APP to the execution state.

The APP operator 171 may control the display unit 140 to display all APP data generated during an APP execution process. The APP operator 171 may control the display unit 140 to display only some of the APP data generated during the APP execution process. Thereafter, the remaining APP data may be processed as the background. For example, the APP operator 171 may control the display unit 140 to load the remaining APP data to the frame buffer but not display the loaded remaining APP data.

When receiving an input signal from the input unit 120 or the second electronic device 200, the APP operator 171 may transmit the input signal to the APP. The input signal may be transmitted to an "APP displaying APP data on an uppermost part of the screen". For example, when a webpage is displayed on the uppermost part and schedule information is displayed below the webpage, the input signal may be transmitted to a web browser.

When an event related to a change in the display mode is detected, the APP operator 171 may change the display mode of the APP data in response to the event. For example, in response to detection of an event related to a change in the display mode, the APP operator 171 may change the display mode of the APP data. The event may be an event generated by the input unit 120, an event received from the outside through the communication unit 110 or the connector 160, or an event generated by the sensor unit (e.g., acceleration sensor). According to various embodiments of the present disclosure, the APP operator 171 may not respond to the event. For example, when a display mode of a particular APP is designated as a landscape mode by default, the display mode of the corresponding APP data may remain in the landscape mode regardless of the event.

The APP operator 171 may transmit together an input signal from the input unit 120 and an input signal from the second electronic device 200 to one APP. The APP operator 171 may sequentially transmit the input signals to one APP based on time information (e.g., a time point when the input signal is generated, a time point when the input signal is received, and/or the like).

The APP data collector 173 collects APP data generated according to the APP execution. For example, when APP data is written in the main memory by the executed APP, the APP data collector 173 may collect the written APP data. At this time, the APP data collector 173 may collect all the written APP data. Further, the APP data collector 173 may collect only some of the written APP data. For example, the APP data collector 173 may collect only the APP data selected to be transmitted to the second electronic device 200. The APP data collector 173 may collect only updated APP data.

The buffer operator 175 may allocate buffers to activated APPs. When the activated APP is executed and accordingly APP data is generated, the APP data collector 173 may write the APP data in the corresponding buffer. The APP data written in the buffer may be transmitted to the second electronic device 200 through the connector 160. At this time, together with the corresponding APP data, identification information (e.g., a name of the corresponding APP) for identifying the APP data may be transmitted to the second electronic device 200.

The buffer operator 175 may newly allocate a buffer when a new APP is activated, and may recall the allocated buffer when the activated APP is terminated.

The APP data transmitter 177 is a component for transmitting collected APP data to the second electronic device 200. To this end, the APP data transmitter 177 may control a formation of a communication channel between the connector 160 and the second electronic device 200. For example, the APP data transmitter 177 may create at least one of various communication channels including a Wi-Fi communication channel, a USB communication channel, a UART communication channel, a BT communication channel, and/or the like between the APP data transmitter 177 and the second electronic device 200. Further, the APP data transmitter 177 may transmit some APP data to the second electronic device 200 through the USB communication channel and other APP data to the second electronic device 200 through the BT communication channel. In addition, the APP data transmitter 177 may transmit the remaining APP data to the second electronic device 200 through the Wi-Fi communication channel or the UART communication channel.

Figure 4:
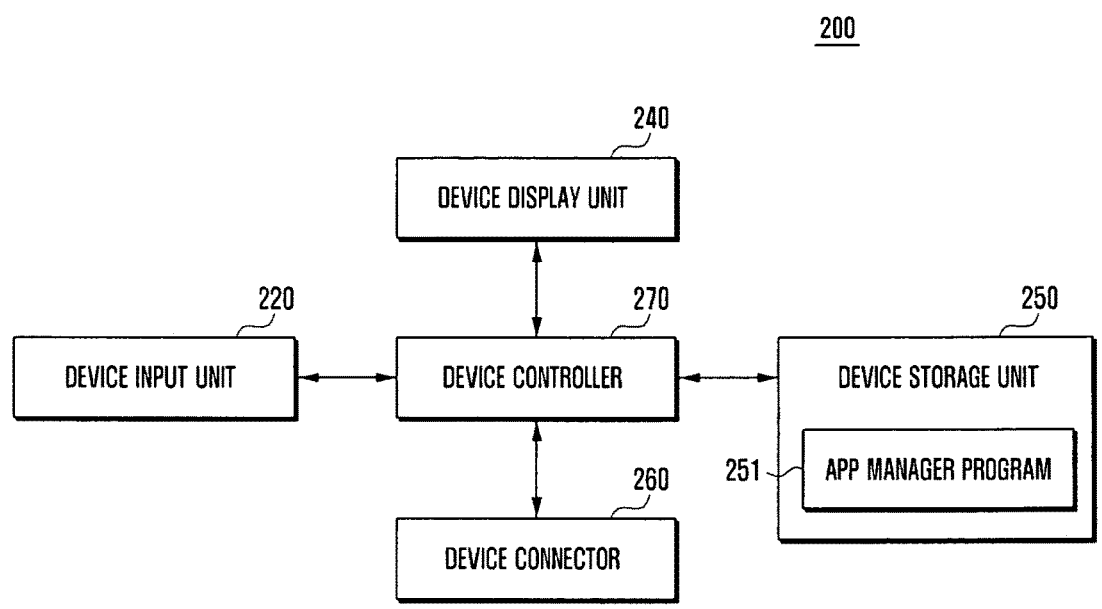
FIG. 4 illustrates a configuration of a second electronic device according to the present disclosure.

FIG. 4 illustrates a configuration of a second electronic device according to an embodiment of the present disclosure.

Referring to FIG. 4, the second electronic device 200 may include an input unit 220, a device display unit 240, a device storage unit 250, a device connector 260, and a device controller 270.

The device input unit 220 may generate an input signal. The device input unit 220 may include various mechanical devices such as a keyboard, a mouse, a voice input device, an electronic pen, and/or the like. Further, the device input unit 220 may include a touch screen. The device input unit 220 may generate an input signal for running particular APPs of the first electronic device 100 output through the second electronic device 200.

For example, the device input unit 220 may generate an input signal selecting an APP display area corresponding to at least one APP operated by the first electronic device 100, an input signal running an APP corresponding to the selected APP display area, and an input signal switching an APP display mode corresponding to the selected APP display area according to a user input. Further, the device input unit 220 may generate an input signal making a request for an activation of a particular APP which can be operated by the first electronic device 100, an input signal for at least one of a size control or a position change of a particular APP display area, an input signal for terminating an execution of the APP, an input signal for terminating the activation of the APP according to a user input, and/or the like. The input signal generated by the input unit 220 may be transmitted to the first electronic device 100 according to a control of the device controller 270.

The device display unit 240 may display various pieces of information, for example, an icon, a menu, and/or the like for the operation of the second electronic device 200. The device display unit 240 may display APP data provided by the first electronic device 100 on the APP display area. The APP display area may be a part of the screen of the device display unit 240. Of course, the APP display area may be an entirety of the screen. When the APP display area is the part of the screen, a display position of the APP display area may be changed according to an input signal. Further, a size of the APP display area may be changed according to an input signal. The input signal may be generated by the device input unit 220 or received from the first electronic device 100.

The device storage unit 250 may be implemented by a disc, a RAM, a ROM, a flash memory, and/or the like. The device storage unit 250 may store a booting program, at least one operating system, applications, and/or the like. Further, the device storage unit 250 may store data generated according to the operation of the second electronic device 200 or received from an external device through the device connector 260. According to various embodiments of the present disclosure, the device storage unit 250 may include a program configured to support control of the second electronic device 200 such that APP data of the first electronic device 100 is displayed on the APP display area, for example, an APP manager program 251. For example, the device storage unit 250 may store the APP manager program 251. The APP manager program 251 may be also stored in the first electronic device 100. For example, the first electronic device 100 may be used as the APP output device.

The APP manager program 251 may include a routine supporting the connection with the first electronic device 100 and a routine making support such that APP data received from the first electronic device 100 is displayed on the APP display area. The APP manager program 251 may include a routine controlling a position and a size of the APP display area according to an input signal, a routine transmitting an input signal from the device input unit 220 to the first electronic device 100, and/or the like. In addition, the APP manager program 251 may include a routine determining a display mode of a particular APP, a routine for supporting control of the second electronic device 200 such that corresponding APP data is displayed in the determined display mode.

The device connector 260 may be a component for the connection with the first electronic device 100. The device connector 260 may include a wired communication module, such as, for example, a USB interface, a UART interface, and/or the like. The device connector 260 may include a wireless interface, for example, a short distance communication module, such as a Bluetooth module, a ZigBee module, an UWB module, a RFID module, an infrared communication module, a WAP module, and/or the like. In addition, the device connector 1160 may include a plurality of ports and a plurality of short distance communication modules for connections with a plurality of external devices as well as one external device.

The device controller 270 may have the same components as those of the controller 170 (e.g., the CPU), the GPU, the memory, and the AP. According to various embodiments of the present disclosure, the device controller 270 may control transmission of a control signal, processing of data, buffering of APP data, displaying of APP data, a collection of an input signal, and transmission of an input signal to control the second electronic device 200. To this end, the device controller 270 may include a configuration as illustrated in FIG. 5.

Figure 5:
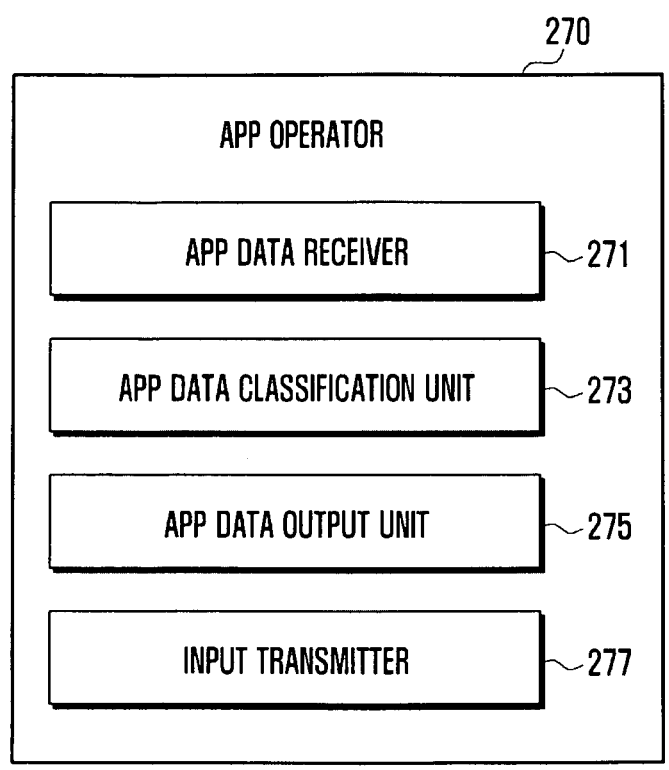
FIG. 5 illustrates a configuration of a device controller such as the device controller illustrated in FIG. 4 in more detail according to an embodiment of the present disclosure.

FIG. 5 illustrates the configuration of a device controller such as, for example, the device controller illustrated in FIG. 4 in more detail according to an embodiment of the present disclosure.

Referring to FIG. 5, when the first electronic device 100 is connected to the device controller 270 through the device connector 260, the device controller 270 may activate the APP manager program 251. For example, in response to the first electronic device 100 being connected to the second electronic device 200, the device controller 270 may activate the APP manager program 251. The device controller 270 may serve as an APP manager by the APP manager program 251. The device controller 270 may include an APP data receiver 271, an APP data classification unit 273, an APP data output unit 275, and an input transmitter 277.

When the connection with the first electronic device 100 is made through the device connector 260, the APP data receiver 271 may process a signal for the connection with the first electronic device. Further, the APP data receiver 271 may receive APP data from the first electronic device 100. At this time, the APP data receiver 271 may receive APP data stored in separate buffers from the respective buffers or may receive all the APP data having identification information. The APP data receiver 271 provides the received APP data to the APP data classification unit 273.

The APP data classification unit 273 may identify the received APP data and may classify the received APP data for each APP. The APP data classification unit 273 may identify information of the buffer from which the corresponding APP data has been transmitted or may identify identification information of the corresponding APP data. The APP data classification unit 273 may load the respective APP data in the memory allocated to the device display unit 240 of the second electronic device 200. According to various embodiments of the present disclosure, the APP data classification unit 273 may configure APP display areas corresponding to the respective APP data according to setting information and may load the APP display areas to the memory.

The APP data output unit 275 may be a component for outputting the APP display areas, which have been classified and loaded to the memory by the APP data classification unit 273, to the device display unit 240. The APP data output unit 275 may output the APP display areas loaded to the memory to a predetermined area of the device display unit 240 according to the setting information. For example, the APP data output unit 275 may output the respective APP display areas to the device display unit 240 according to an input signal received from the device input unit 220. Further, the APP data output unit 275 may make support such that the respective APP display areas are automatically output to a predetermined area of the device display unit 240 according to an input signal received from the device input unit 220. The APP data output unit 275 may identify display mode information of the respective APP data and may output the APP data according to any one of a landscape mode and a portrait mode. Further, the APP data output unit 275 may support an output of a hidden area, which is not output on the display unit 140 of the first electronic device 100, to the device display unit 240. Meanwhile, the APP data output unit 275 may output a list including APP items which can be operated by the first electronic device 100.

The input transmitter 277 may collect an input signal that is input from the device input unit 220 and may provide the input signal to the first electronic device 100 through the device connector 260. The input transmitter 277 may also transmit, to the first electronic device 100, a type of the input signal and APP ID information to which the input signal will be applied. For example, the input transmitter 277 may collect an APP display area selection signal, an input signal for operating a specific APP and an input signal for changing an APP display mode, and may transmit the collected signals to the APP operating device. The input signal for operating the APP may include a text input signal, a specific link selection signal output to the APP display area, an input signal for inputting a specific image, a voice signal, and/or the like.

The second electronic device 200 may further include a microphone device for collecting a voice signal to transmit the voice signal.

Figure 6:
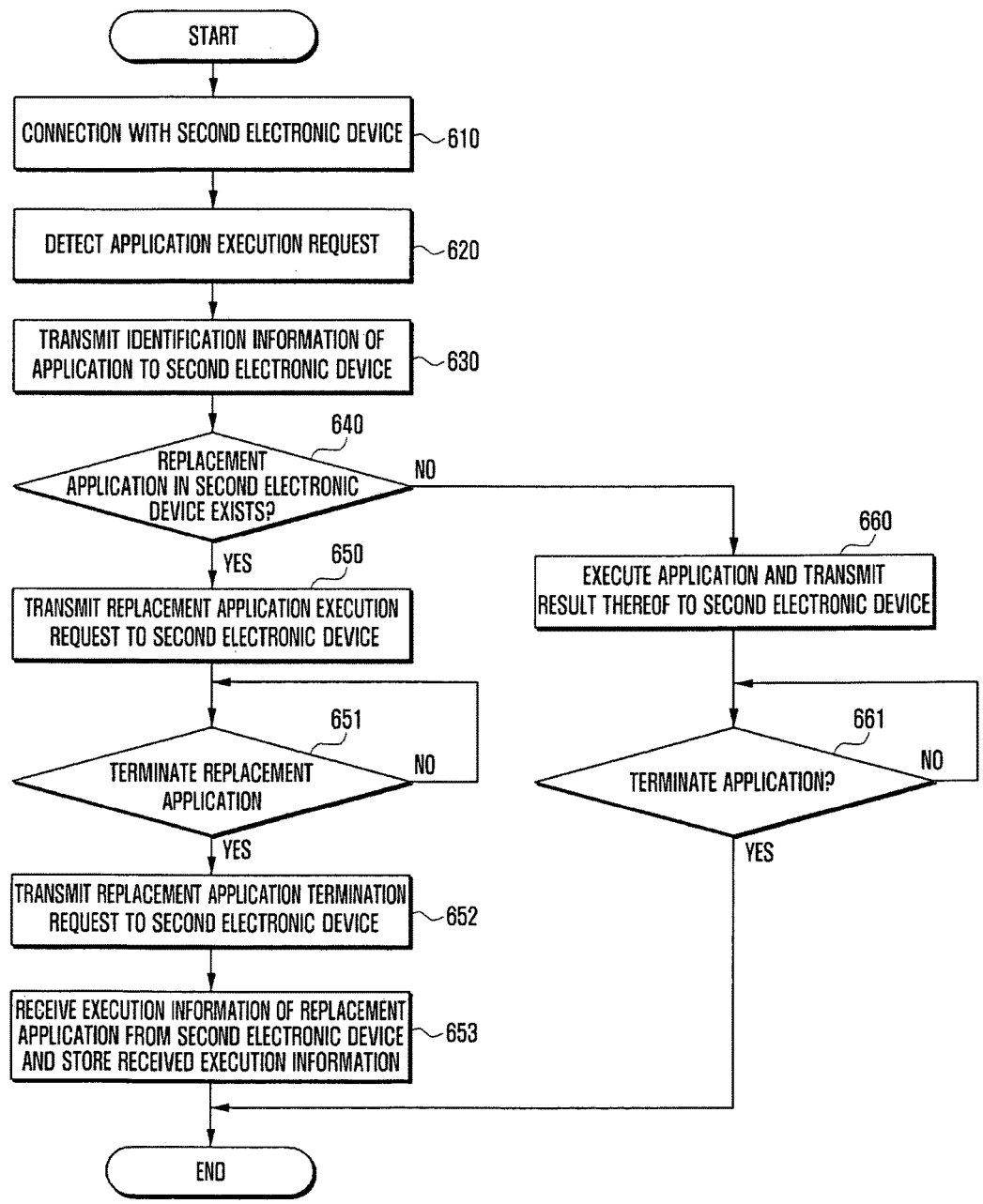
FIG. 6 is a flowchart describing a method of operating a first electronic device according to an embodiment of the present disclosure.

FIG. 6 is a flowchart describing a method of operating a first electronic device according to an embodiment of the present disclosure.

Referring to FIG. 6, at operation 610, the controller 170 may perform a connection with the second electronic device 200. For example, when an event is detected, the controller 170 may determine whether the corresponding event corresponds to the connection with the second electronic device 200. The first electronic device 100 may include a circuit for recognizing the connection when the second electronic device 200 is connected to the connector 160. For example, when the second electronic device 200 is connected to the connector 160, a pull-up voltage may be changed. The circuit transmits the changed value to the controller 170. Thereafter, the controller 170 may recognize the connection between the second electronic device 200 and the connector 160.

At operation 620, the controller 170 may detect an application execution request from the input unit 120 in a state in which the second electronic device 200 is connected to the connector 160. Further, the controller 170 may detect the application execution request from the second electronic device 200 through the connector 160.

When the application execution request is detected, the controller 170 may proceed to operation 630 at which the controller 170 may control the connector 160 to transmit identification information of the application to the second electronic device 200. In response to the control, the second electronic device 200 may determine whether the application corresponding to the identification information has been installed in the second electronic device 200 itself and may transmit the identified "installation result value" to the controller 170 through the connector 160 of the first electronic device 100.

At operation 640, the controller 170 may determine whether a replacement application which can replace the execution requested application has been installed in the second electronic device 200. The replacement application may refer to an application classified as the same type of the execution requested application. For example, when the execution requested application is "Internet Explorer" corresponding to a type of web browser, the replacement application may be Internet Explorer, Chrome, and/or the like.

As an example of the determination method, the controller 170 identifies (e.g., determines) the "installation result value" received from the second electronic device 200. As a result of the identification, when the "installation result value" indicates that "the replacement application exists", the controller 170 determines that the replacement application has been installed in the second electronic device 200.

As a result of the identification, when the "installation result value" indicates that "the replacement application does not exist", the controller 170 determines that the replacement application has not been installed in the second electronic device 200.

As another example, the storage unit 150 may store information on a list of applications installed in the second electronic device 200. The list information may be, for example, information shared between the two devices (e.g., the first electronic device 100 and the second electronic device 200) during a connection process between the two devices (e.g., the first electronic device 100 and the second electronic device 200). The controller 170 accesses the storage unit 150 to read the list information. When the replacement application is included in the read list information, the controller 170 determines that the replacement application has been installed in the second electronic device 200. When the replacement application is not included in the read list information, the controller 170 determines that the replacement application has not been installed in the second electronic device 200. When the replacement application has been determined to have been installed in the second electronic device 200 through such a method, operation 630 may be omitted. For example, when the application execution request is detected in the state in which the second electronic device 200 is connected to the connector 160, the controller 170 may access the storage unit 150 to read the list information.

If the controller 170 determines that the replacement application has been installed in the second electronic device 200 at operation 640, then the controller 170 may proceed to operation 650 at which the controller 170 controls the connector 160 to transmit an execution request of the replacement application to the second electronic device 200. At this time, an execution request message may include data which can be processed by the replacement application (e.g., message, picture, video file, document file, and/or the like) or one or more pieces of Internet address information (e.g., www.youtube.com). In response to the execution request, the second electronic device 200 may execute the replacement application and output a result according to the execution. The output may include one or more of visual feedback and auditory feedback. For example, a video may be reproduced, a part of the document may be displayed, a webpage may be displayed, or a chatting message may be displayed. As described above, when the execution of the application installed in the first electronic device 100 is requested, the replacement application installed in the second electronic device 200 is actually executed rather than the application installed in the first electronic device 100 being executed.

At operation 651, the controller 170 determines whether to terminate the execution of the replacement application.

If the controller 170 determines not to terminate the replacement application at operation 651, then the controller 170 may continue to poll for an indication and/or determination to terminate the execution of the replacement application.

If the controller 170 determines to terminate the execution of the replacement application at operation 651, then the controller 170 may proceed to operation 652 at which the controller 170 may transmit a replacement application termination request to the second electronic device. For example, when an execution termination request is detected through the input unit 120 or the connector 160, the controller 170 controls the connector 160 to transmit the termination request of the replacement application to the second electronic device 200 in operation 652. In response to the termination request, the second electronic device 200 may terminate the execution of the replacement application and store execution information related to a result output just before the termination (e.g., video file, document file, Internet address information of a lastly displayed webpage, and/or the like) in the memory of the second electronic device 200. Accordingly, the second electronic device 200 may execute the corresponding application based on the stored execution information after the connection with the first electronic device 100 is disconnected. Further, the second electronic device 200 may transmit the execution information to the first electronic device 100.

At operation 653, the controller 170 may receive the execution information from the second electronic device 200. For example, the controller 170 may receive the execution information from the second electronic device 200 through the connector 160. The controller 170 may store the received execution information in the storage unit 150. Further, the first electronic device 100 may execute the corresponding application based on the execution information received from the second electronic device 200 after the connection with the second electronic device 200 is disconnected.

In contrast, if the controller 170 determines that the replacement application has not been installed in the second electronic device 200 at operation 640, then the controller 170 may proceed to operation 660 at which the controller 170 executes the execution requested application and controls the connector 160 to transmit a result according to the execution to the second electronic device 200. Accordingly, the second electronic device 200 may receive and output the result. For example, a video may be reproduced, a part of the document may be displayed, a webpage may be displayed, a chatting message may be displayed, and/or the like.

Thereafter, at operation 661, the controller 170 determines whether to terminate the execution of the application.

If the controller 170 determines not to terminate the execution of the application at operation 661, then the controller 170 may continue to poll for an indication and/or a determination to terminate the execution of the application.

In contrast, if the controller 170 determines to terminate execution of the application at operation 661, then the controller 170 may terminate the execution of the application. For example, when an execution termination request is detected through the input unit 120 or the connector 160, the controller 170 may terminate the execution of the application and store "execution information related to a result output just before the termination" in the storage unit 150. Further, the first electronic device 100 may transmit the execution information to the second electronic device 200. Accordingly, the second electronic device 200 may store the received execution information in the memory of the second electronic device 200.

Figure 7:
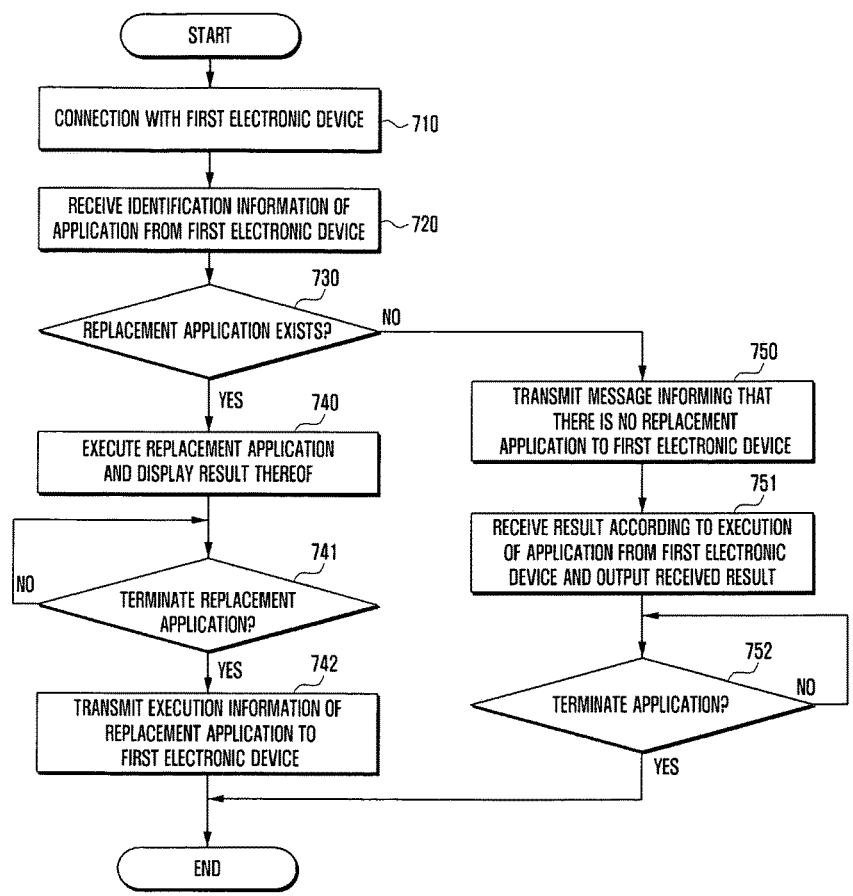
FIG. 7 is a flowchart describing a method of operating a second electronic device according to an embodiment of the present disclosure.

FIG. 7 is a flowchart describing a method of operating a second electronic device according to an embodiment of the present disclosure.

Referring to FIG. 7, at operation 710, the controller 270 may perform a connection with the first electronic device 100. For example, when a pull-up voltage is changed according to the connection with the first electronic device 100, the device connector 260 transmits the change to the device controller 270. Thereafter, the device controller 270 may recognize the connection between the first electronic device 100 and the device connector 260.

When the second electronic device 200 is connected with the first electronic device 100, at operation 720, the device controller 270 receives identification information of the application from the first electronic device 100 through the device connector 260.

At operation 730, the device controller 270 may determine whether a replacement application exists. For example, the device controller 270 accesses the device storage unit 250 to read list information in response to the reception of the identification information and identifies (e.g., determines) whether the list information includes a replacement application corresponding to the identification information.

If the device controller 270 determines that a replacement application exists (e.g., when the list information includes the replacement application corresponding to the identification information) at operation 730, then the device controller 270 may proceed to operation 740 at which the device controller 270 may control the device connector 260 to transmit a result value indicating that there is the replacement application to the first electronic device 100. Accordingly, the device controller 270 may receive an execution file which can be executed through the replacement application and address information from the first electronic device 100. Thereafter, the device controller 270 may execute the replacement application by using the execution file or the address information and control to output a result thereof. For example, when a reproduction file (e.g., video, music, and/or the like) is received, a reproducer is executed and the received reproduction file is reproduced. When the address information is received, a web browser is executed and a webpage corresponding to the received address information is displayed. When the document file is received, a document viewer (e.g., word processor) is executed and the received document is displayed.

At operation 741, the device controller 270 determines whether to terminate the execution of the replacement application.

If the device controller 270 determines not to terminate the replacement application at operation 741, then the device controller 270 may continue to poll for an indication and/or determination to terminate the execution of the replacement application.

If the device controller 270 determines to terminate the execution of the replacement application at operation 741, then the controller 170 may proceed to operation 742 at which the controller 170 may transmit execution information of a replacement application to the first electronic device 100. For example, when an execution termination request is detected through the device input unit 220 or the device connector 260, the device controller 270 may terminate the execution of the replacement application and control the device connector 260 to transmit execution information related to a result output just before the termination to the first electronic device 100. Further, the device controller 270 may store the execution information in the device storage unit 250.

If the device controller 270 determines that a replacement application does not exist (e.g., when the list information does not include replacement application corresponding to the identification information) at operation 730, then the device controller 270 may proceed to operation 750 at which the device controller 270 may control the device connector 260 to transmit a message indicating that there is no replacement application to the first electronic device 100.

At operation 751, the device controller 270 receives a result according to the execution of the application from the first electronic device 100 through the device connector 260 and controls to output the result according to the execution of the application.

At operation 752, the device controller 270 determines whether to terminate the execution of the application.

If the device controller 270 determines not to terminate the execution of the application at operation 750, then the controller 170 may continue to poll for an indication and/or determination to terminate the execution of the application.

In contrast, if the device controller 270 determines to terminate execution of the application at operation 752, then the device controller 270 may terminate the execution of the application. For example, when the execution termination request is detected through device input unit 220, the controller 270 controls the device connector 260 to transmit a message making a request for terminating the execution of the application to the first electronic device 100. Further, the controller 270 may store execution information related to a result just before the detection of the execution termination request in the device storage unit 250. Meanwhile, the execution termination request may be received from the first electronic device 100 through the device connector 260. Thereafter, the device controller 270 may store the execution information related to the result just before the detection of the execution termination request in the device storage unit 250.

Figure 8:
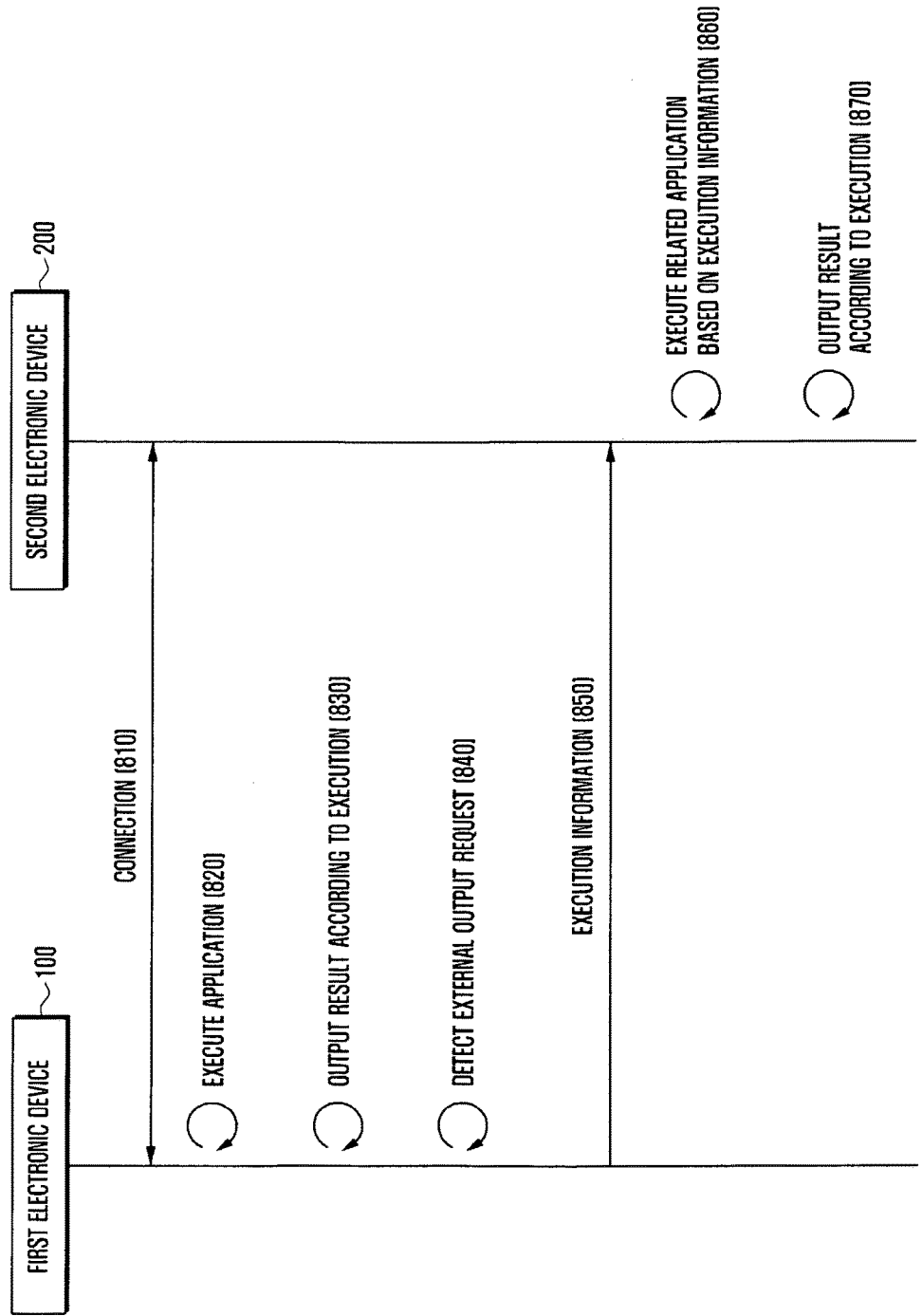
FIG. 8 is a flowchart describing a method of operating an APP operating system according to an embodiment of the present disclosure.

FIG. 8 is a flowchart describing a method of operating an APP operating system according to an embodiment of the present disclosure.

Referring to FIG. 8, at operation 810, the first electronic device 100 and the second electronic device 200 may perform a connection process. Through the connection process, a wired communication channel and/or a wireless communication channel is formed between the first electronic device 100 and the second electronic device 200. Further, during the connection process, the first electronic device 100 and the second electronic device 200 may share device information. For example, when the first electronic device 100 is a smart phone, the first electronic device 100 may transmit information indicating that the first electronic device 100 is the smart phone, capability information, information on a list of installed applications and the like to the second electronic device 200. As another example, the second electronic device 200 is a notebook PC, the second electronic device 200 may transmit information indicating that the second electronic device 200 is the notebook PC, capability information, information on a list of installed applications and the like to the first electronic device 100. Such a process of sharing device information may be performed only when the two devices 100 and 200 are initially connected to each other.

If the two devices 100 and 200 are connected to each other, then at operation 820, the first electronic device 100 may detect an application execution request from the input unit 120 and execute the application in response to the execution request.

At operation 830, the first electronic device 100 may output a result according to the execution of the application.

At operation 840, during the execution of the application, the first electronic device 100 may detect an external output request (e.g., flick of a touch input means on the screen) of the user.

When the external output request is detected (e.g., in response to detection of the external output request), at operation 850, the first electronic device 100 may transmit execution information related to the output result (e.g., video file, document file, Internet address information, attribute information of the output result (e.g., reader mode), and/or the like) to the second electronic device 200.

When receiving the execution information from the first electronic device 100 (e.g., in response to receiving the execution information), the second electronic device 200 selects a related application to be executed from the installed applications by using the received execution information. At operation 860, the second electronic device 200 executes the related application by using the received execution information.

At operation 870, the second electronic device 200 outputs a result according to the execution of the related application.

Examples using the system operating method described with reference to FIG. 8 will be described with reference to FIGS. 9 to 11.

Figure 9:
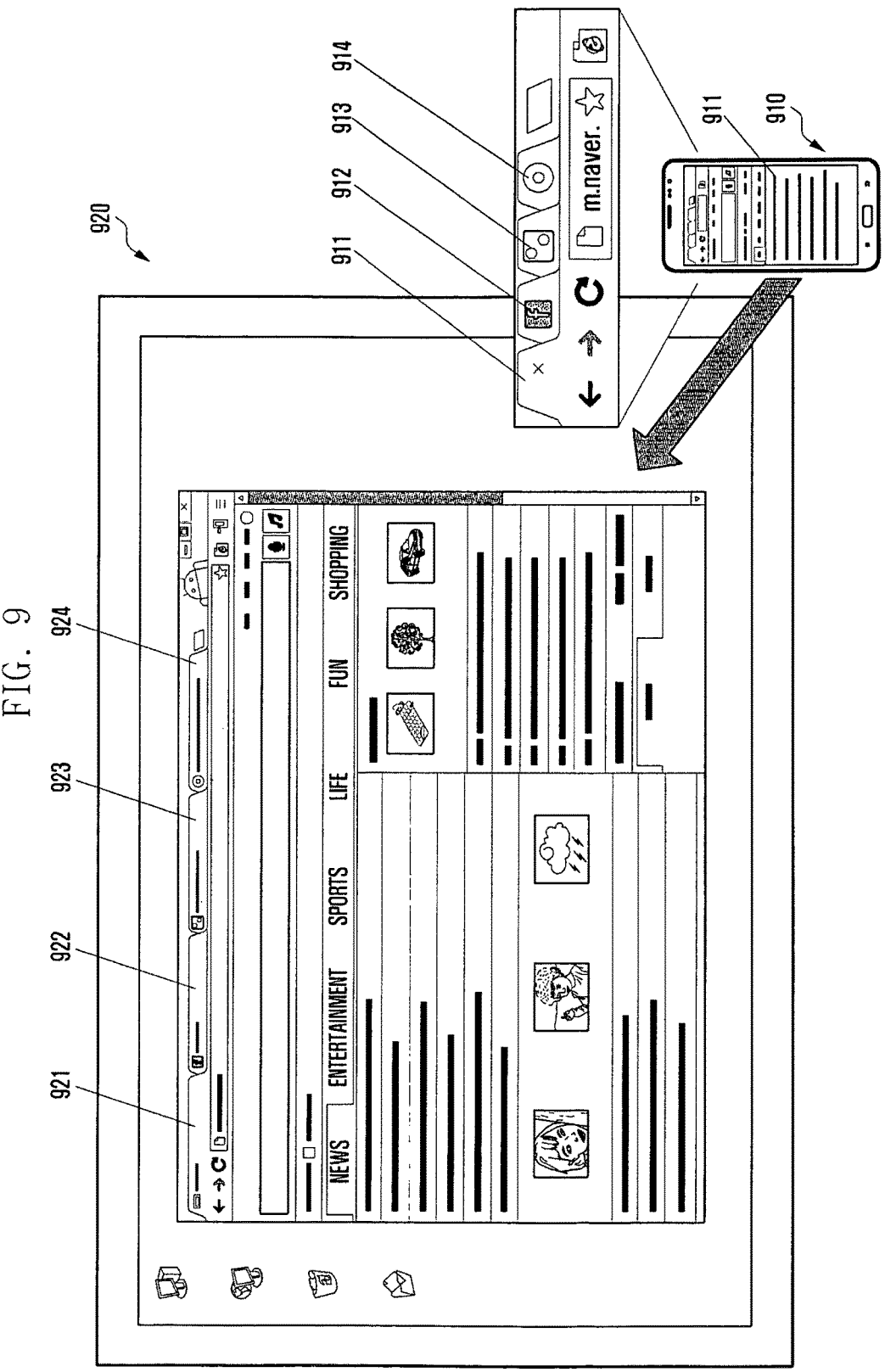
FIG. 9 is a view describing an example of Internet address bundle transmission according to an embodiment of the present disclosure.

FIG. 9 is a view describing an example of Internet address bundle transmission according to an embodiment of the present disclosure.

Referring to FIG. 9, a smart phone 910 executes a web browser and displays one of webpages 911, 912, 913, and 914. As an example, the web browser may display the webpage 911 as a result of the execution. At this time, the user puts a finger on the screen of the smart phone 910 and makes a touch gesture (e.g., flick). In response to the detected gesture, the smart phone 910 performs a corresponding function. For example, in response to the touch gesture (e.g., the flick), the smart phone 910 detects the touch gesture and transmits Internet address information of each of the webpages 911, 912, 913, and 914 to a smart TV 920. The smart phone 910 may transmit tap order information, activated webpage information and the like to the smart TV 920 together with the Internet address information.

The smart TV 920 executes a web browser in response to the reception of the Internet address information, accesses websites corresponding to the received respective Internet address information, receives webpages 921, 922, 923, and 924 from the accessed websites, determines an order of the webpages 921, 922, 923, and 924 based on the tap order information, determines a webpage (e.g., webpage 921) among the webpages based on the activated webpage information, and displays the determined webpage 921.

When the smart phone 910 is connected with the smart TV 920, the user can view the same webpages which the user had viewed in the smart phone 910 also in the smart TV 920 through a simple control. Meanwhile, the smart phone 910 may transmit other information related to the web browser (e.g., favorite information, cookie information, login information, and/or the like) as well as the webpage to the smart TV 920 in response to a user's request.

Figure 10:
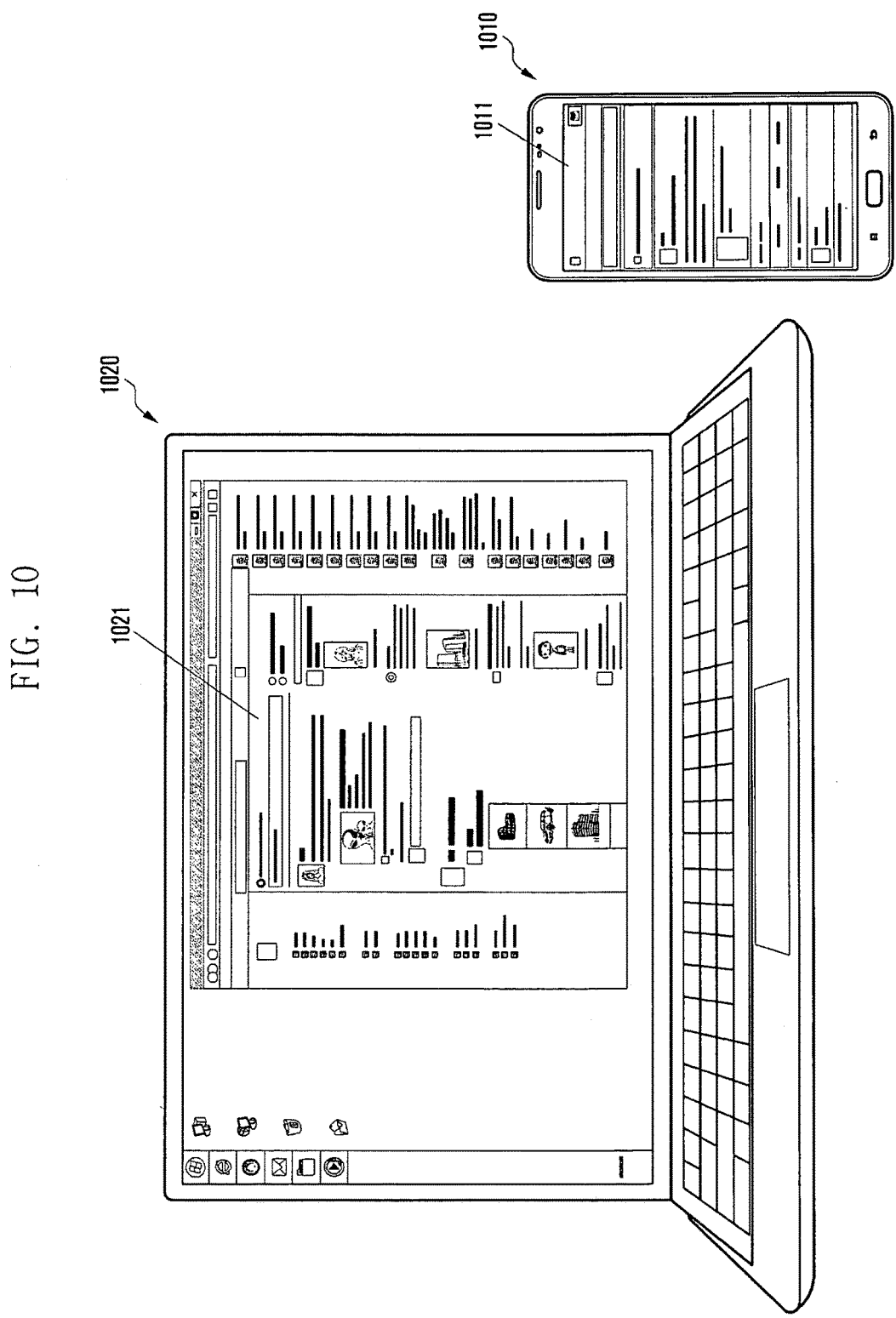
FIG. 10 is a view describing an example of automatically changing a browser environment according to an embodiment of the present disclosure.

FIG. 10 is a view describing an example of automatically changing a browser environment according to an embodiment of the present disclosure.

Referring to FIG. 10, a smart phone 1010 executes a web browser and displays a webpage 1011 as a result of the execution. The smart phone 1010 detects an external output request and transmits Internet address information of the webpage 1011 to a notebook PC 1020 in response to the external output request. According to various embodiments of the present disclosure, the smart phone 1010 may configure information to be transmitted to a format for an intended recipient electronic device. For example, at this time, if the smart phone 1010 recognizes that the connected device is the notebook PC 1020, the smart phone 1010 may change the Internet address information to be suitable for a PC environment and transmit the changed Internet address information to the notebook PC 1020. For example, when an Internet address of the webpage 1011 is "m.naver.com", the smart phone 1010 may transmit "www.naver.com" which is suitable for the PC environment to the notebook PC 1020 instead of "m.naver.com". According to various embodiments of the present disclosure, the smart phone 1010 may transmit information in a native format for the smart phone 1010 and the intended recipient electronic device may configure the format of the information to a format appropriate for the intended recipient electronic device, if necessary. For example, the smart phone 1010 may transmit Internet address information of a mobile environment (e.g. "m.naver.com") to the notebook PC 1020.

The notebook PC 1020 executes a web browser in response to the reception of the Internet address information, accesses a website corresponding to the received Internet address information, receives a webpage 1021 from the accessed website, and displays the webpage 1021. At this time, when the Internet address information received from the smart phone 1010 corresponds to address information of the mobile environment, the notebook PC 1020 may redirect the address information of the mobile environment to an Internet address of the PC environment, receive a webpage corresponding to the redirected Internet address, and display the webpage.

Figure 11:
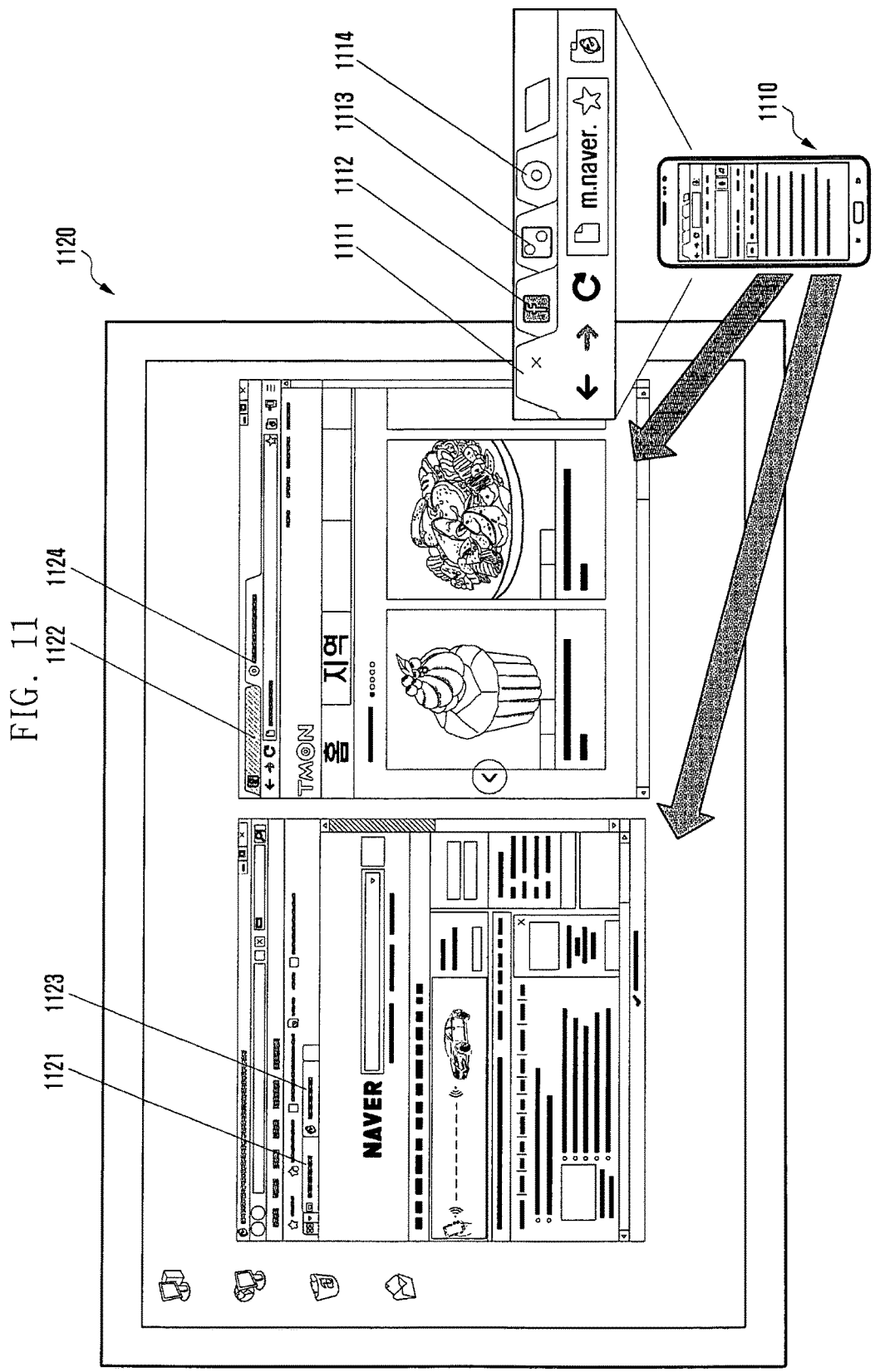
FIG. 11 is a view describing an example of an automatic division control of a browser according to an embodiment of the present disclosure.

FIG. 11 is a view describing an example of an automatic division control of a browser according to an embodiment of the present disclosure.

Referring to FIG. 11, a smart phone 1110 executes a web browser and displays one of webpages 1111, 1112, 1113, and 1114. For example, the smart phone 1110 may display the webpage 1111 as a result of the execution. The smart phone 1110 detects an external output request and transmits Internet address information of each of the webpages 1111, 1112, 1113, and 1114 to a smart TV 1120 in response to the external output request.

At this time, the smart phone 1110 may transmit browser selection information of the respective Internet address information to the smart TV 1120 together with the Internet address information, for example, as illustrated in Table 1. In order to transmit the browser selection information, the smart phone 1110 may first perform a browser selection process. For example, a lookup table like Table 2 may be stored in a memory of the smart phone 1110. When an external output request is detected, the smart phone 1110 may access the memory to read the lookup table. Thereafter, the smart phone 1110 identifies basic domains of the webpages 1111, 1112, 1113, and 1114 and selects browser information mapped to each of the identified basic domains.

TABLE 1

| Internet address information | Browser selection information |
|---|---|
| Webpage 1111 | Internet Explorer |
| Webpage 1112 | Chrome |
| Webpage 1113 | Internet Explorer |
| Webpage 1114 | Chrome |

TABLE 2

| Basic domain | Browser information |
|---|---|
| naver.com<br>youtube.com<br>daum.net<br>*.co.kr | Internet Explorer |
| google.com<br>*.or.kr<br>*.net | Chrome |
| Others | Internet Explorer |

The smart TV 1120 executes each of Internet Explorer and Chrome in response to reception of the information as illustrated in Table 1. For example, the smart TV 1120 may receive (e.g., access) webpages 1121 and 1123 through Internet Explorer and displays one of the webpages (e.g., webpage 1121) through Internet Explorer. The smart TV 1120 may receive (e.g., access) webpages 1122 and 1124 through Chrome and displays one of the webpages, for example, webpage 1122 through Chrome. According to various embodiments of the present disclosure, the browser selection process may be performed by the smart TV 1120, not by the smart phone 1110. For example, a lookup table like Table 2 may be stored in the smart TV 1120.

Meanwhile, according to the system operating method described with reference to FIG. 8, the second electronic device 200 may operate an application in the same environment as an operation environment of the first electronic device 100. For example, when a page output to the first electronic device 100 is in a reader mode, a page output to the second electronic device 200 may be also in the reader mode. The reader mode may be a mode in which editing of the page is not possible. For example, the reader mode may be a mode in which only reading of the page is possible.

Figure 12:
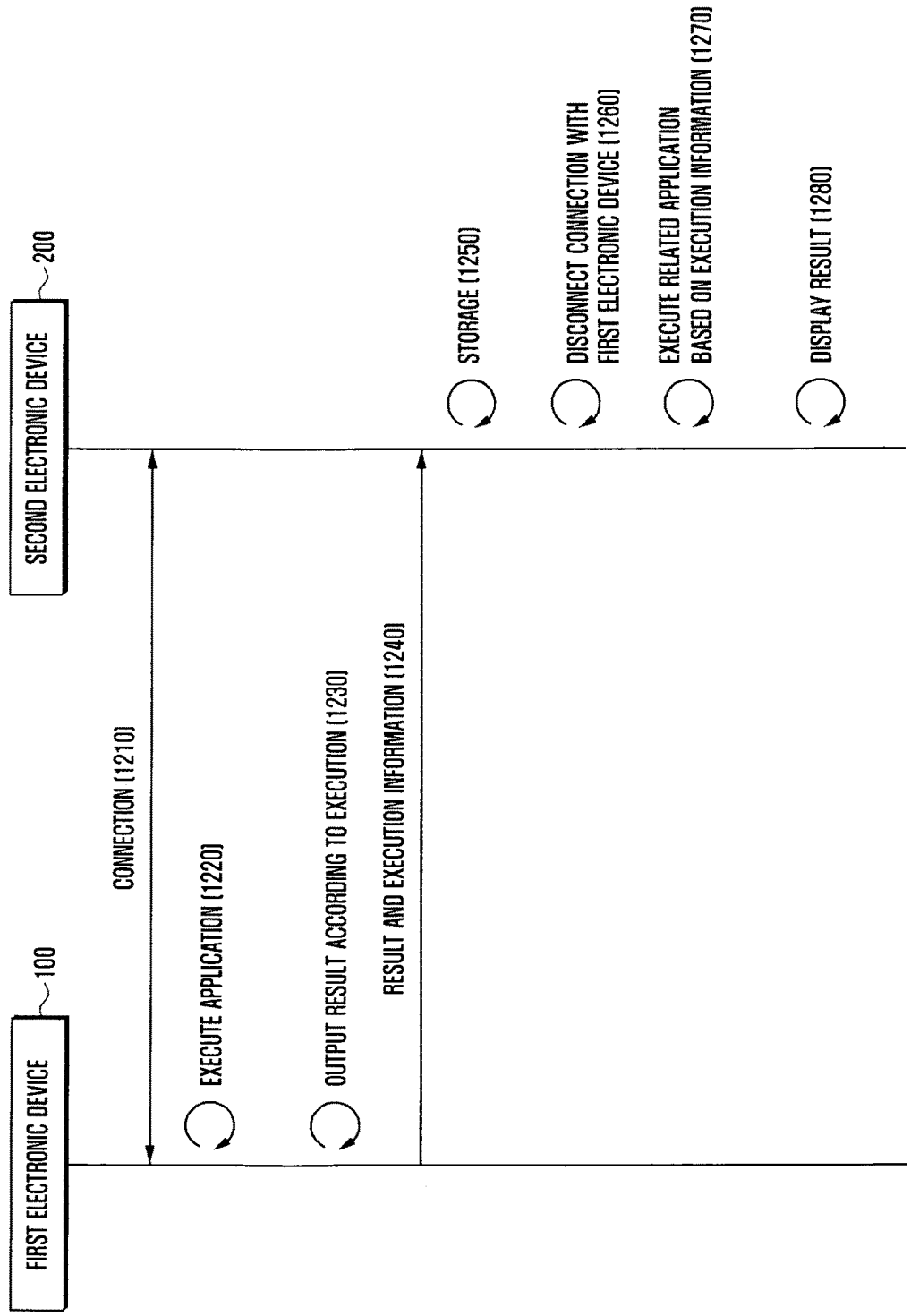
FIG. 12 is a flowchart describing a method of operating an APP operating system according to an embodiment of the present disclosure.

FIG. 12 is a flowchart describing a method of operating an APP operating system according to an embodiment of the present disclosure.

Referring to FIG. 12, at operation 1210, the first electronic device 100 and the second electronic device 200 may perform a connection process. Through the connection process, a wired communication channel and/or a wireless communication channel is formed between the first electronic device 100 and the second electronic device 200. Further, during the connection process, the first electronic device 100 and the second electronic device 200 may share device information (e.g., see the detailed description related to FIG. 8).

If the two devices 100 and 200 are connected to each other, then the first electronic device 100 may detect an application execution request from the input unit 120. At operation 1220, in response to the execution request, the first electronic device 100 may execute the application.

At operation 1230, the first electronic device 100 may output a result according to the execution of the application.

As described above, at operation 1240, during the execution of the application, the first electronic device 100 may transmit related execution information (e.g., Internet address, and/or the like) to the second electronic device 200 together with the output result (e.g., webpage). Meanwhile, when the result, the execution information, or both the result and the execution information are updated, the first electronic device 100 may transmit the updated information to the second electronic device 200. Such a transmission process may be performed whenever the result, the execution information, or both the result and the execution information are updated, or periodically.

At operation 1250, when receiving the result and the execution information thereof from the first electronic device 100 (e.g., in response to receiving the result and the execution information), the second electronic device 200 may store the result and the execution information thereof. Thereafter, when updated information (e.g., result, execution information, or both the result and the execution information) is received, the pre-stored information is changed (e.g., updated) to the updated information.

At operation 1260, the second electronic device 200 may recognize (e.g., detect) that the connection with the first electronic device 100 is disconnected. For example, the second electronic device 200 may receive a value indicating that a pull-up voltage is changed from the device connector 260 and recognize the connection with the first electronic device 100 is disconnected through the value.

At operation 1270, when the connection with the first electronic device 100 is disconnected, the second electronic device 200 may execute a related application based on the stored execution application. Alternatively, when a related application execution request is detected after the connection with the first electronic device 100 is disconnected, the second electronic device 200 may execute the related application.

At operation 1280, the second electronic device 200 outputs (e.g., displays) the stored result.

Examples using the system operating method described with reference to FIG. 12 will be discussed in the following description.

For example, the user may watch the Internet news through a web browser of a PC (e.g., the first electronic device 100) at home. At this time, the Internet news may be automatically transmitted to a smart phone (e.g., the second electronic device 200) of the user which is wirelessly connected to the PC. When the user with the smart phone moves to another location or area (e.g., an elevator), the connection between the PC and the smart phone may be disconnected. As a result, a web browser installed in the smart phone may be automatically executed and the Internet news which the user had watched through the PC may be displayed on the screen of the smart phone. For example, the smart phone may provide the user with the Internet news which the user had watched just before moving to the elevator without access to the Internet.

As another example, a keyword input into the browser of the PC and a result found by the keyword may be displayed on the screen of the PC. At this time, the keyword and the result thereof may be automatically transmitted to the smart phone of the user. When the connection between the PC and the smart phone is disconnected (e.g., in response to disconnection of the PC and the smart phone), the keyword and the result thereof may be immediately displayed on the screen of the smart phone.

Figure 13:
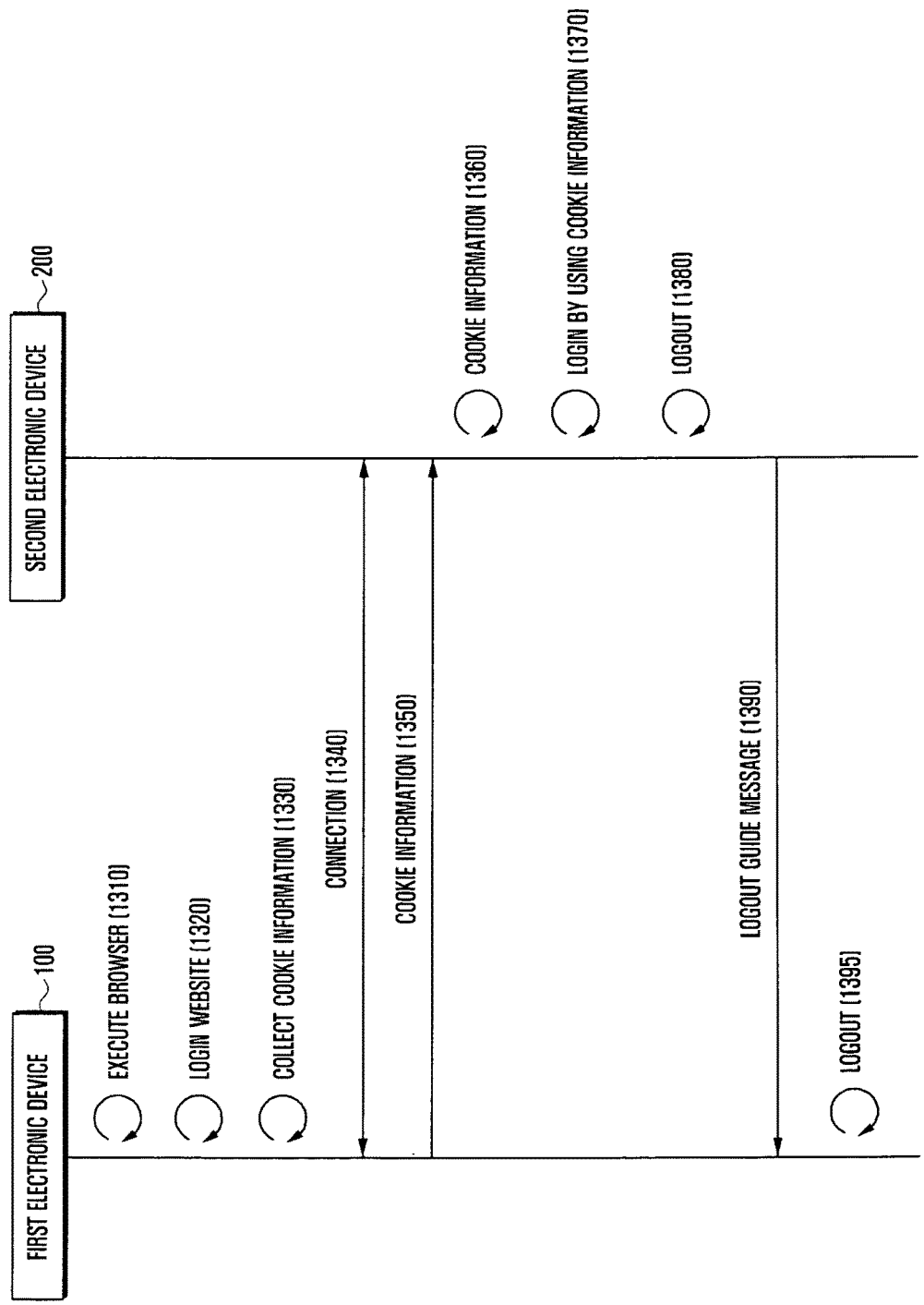
FIG. 13 is a flowchart describing a method of operating an APP operating system according to an embodiment of the present disclosure.

FIG. 13 is a flowchart describing a method of operating ab APP operating system according to an embodiment of the present disclosure.

Referring to FIG. 13, at operation 1310, the first electronic device 100 may execute a web browser. As a result of the execution, a webpage may be displayed on a screen. The webpage may include an ID input box, a password input box, and/or the like.

At operation 1320, when an ID and a password are input into the input boxes (e.g., in response to input of the corresponding ID and password), the first electronic device 100 may transmit a login request message including the ID and the password to a corresponding website. When a login request is authenticated, the website transmits a webpage according to the login authentication to the first electronic device 100. The first electronic device 100 displays the webpage according to the login authentication.

After displaying the webpage according to the login authentication, at operation 1330, the first electronic device 100 may collect execution information on the web browser. For example, the electronic device 100 may collect cookie information in relation to the webpage displayed in the web browser.

At operation 1340, during the collection of the execution information on the web browser (e.g., the cookie information), the first electronic device 100 may perform a connection with the second electronic device 200.

At operation 1350, when the first electronic device 100 is connected with the second electronic device 200, the first electronic device 100 may transmit the execution information on the web browser (e.g., the cookie information) to the second electronic device 200.

At operation 1360, when receiving the execution information on the web browser (e.g., the cookie information) (e.g., in response to receiving the cookie information), the second electronic device 200 may execute the web browser.

At operation 1370, the second electronic device 200 may automatically log in the website by using the execution information on the web browser (e.g., the cookie information).

At operation 1380, the second electronic device 200 may detect a logout request. For example, after logging in the website, the second electronic device 200 may detect a logout request from the device input unit 220.

When detecting the logout request (e.g., in response to detection of the logout request), the second electronic device 200 may perform a logout process. At operation 1390, when the logout process is completed, the second electronic device 200 may transmit a logout guide message to the first electronic device 100.

At operation 1395, in response to reception of the logout guide message, the first electronic device 100 may perform the logout process.

Figure 14:
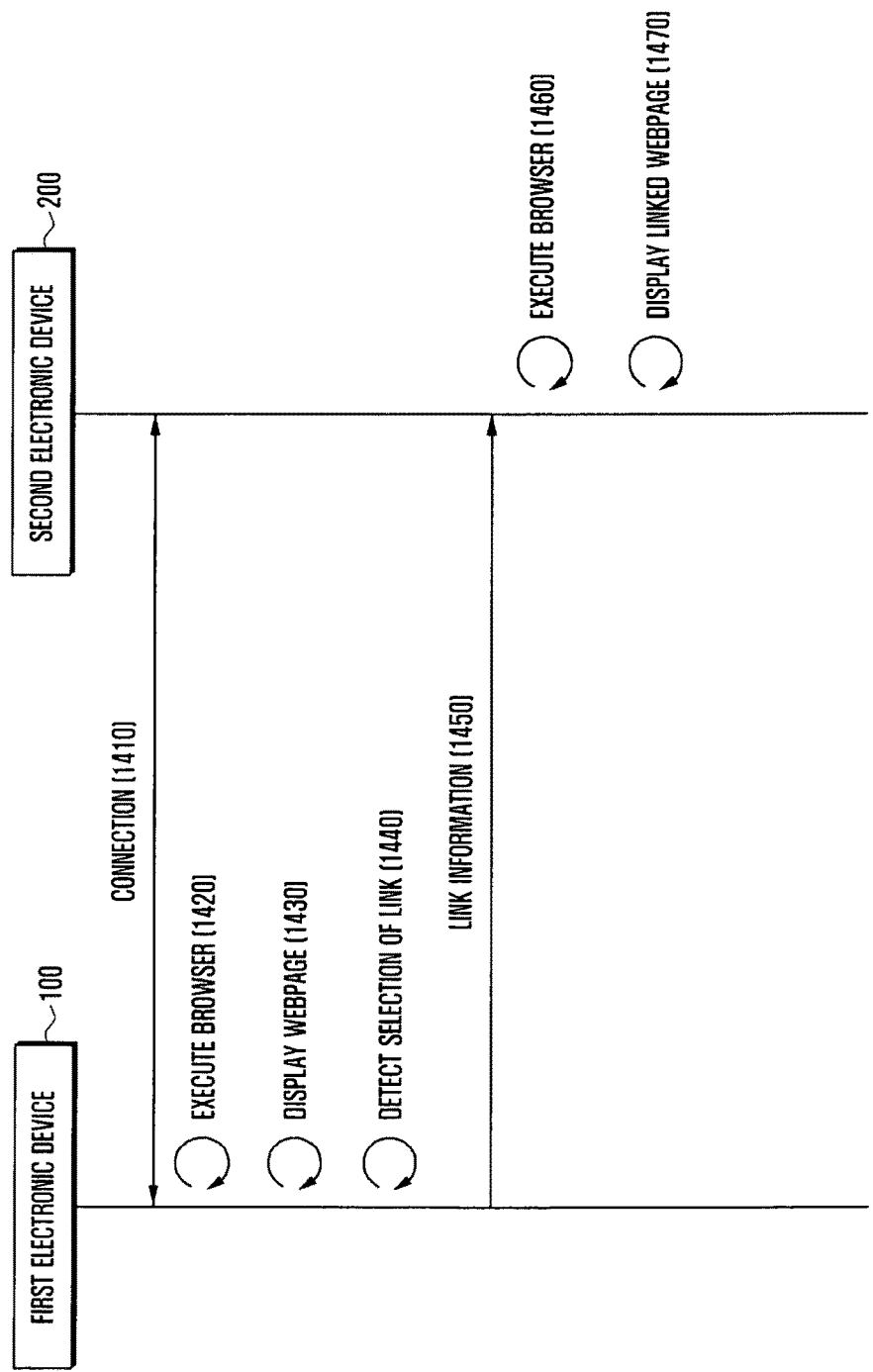
FIG. 14 is a flowchart describing a method of operating an APP operating system according to an embodiment of the present disclosure.

FIG. 14 is a flowchart describing a method of operating an APP operating system according to an embodiment of the present disclosure.

Referring to FIG. 14, at operation 1410, the first electronic device 100 and the second electronic device 200 may perform a connection process. Through the connection process, a wired communication channel and/or wireless communication channel is formed between the first electronic device 100 and the second electronic device 200. Further, during the connection process, the first electronic device 100 and the second electronic device 200 may share device information (e.g., see the detailed description related to FIG. 8).

At operation 1420, during such a connection state, the first electronic device 100 may execute a web browser.

At operation 1430, as a result of the execution, a webpage may be displayed on the screen of the first electronic device 100.

At operation 1440, the first electronic device 100 may detect a selection of a link in the webpage.

At operation 1450, when detecting the selection of the link (in response to detection of the selection of the link), the first electronic device 100 transmits execution information of the web browser to the second electronic device. For example, in response to detection of the selection of the link, the first electronic device 100 transmits link information (e.g., including Internet address information) to the second electronic device 200.

At operation 1460, in response to reception of the link information, the second electronic device 200 executes the web browser.

At operation 1470, the second electronic device 200 displays the linked webpage.

An example of the system operating method described with reference to FIG. 14 will be described with reference to FIG. 15.

Figure 15:
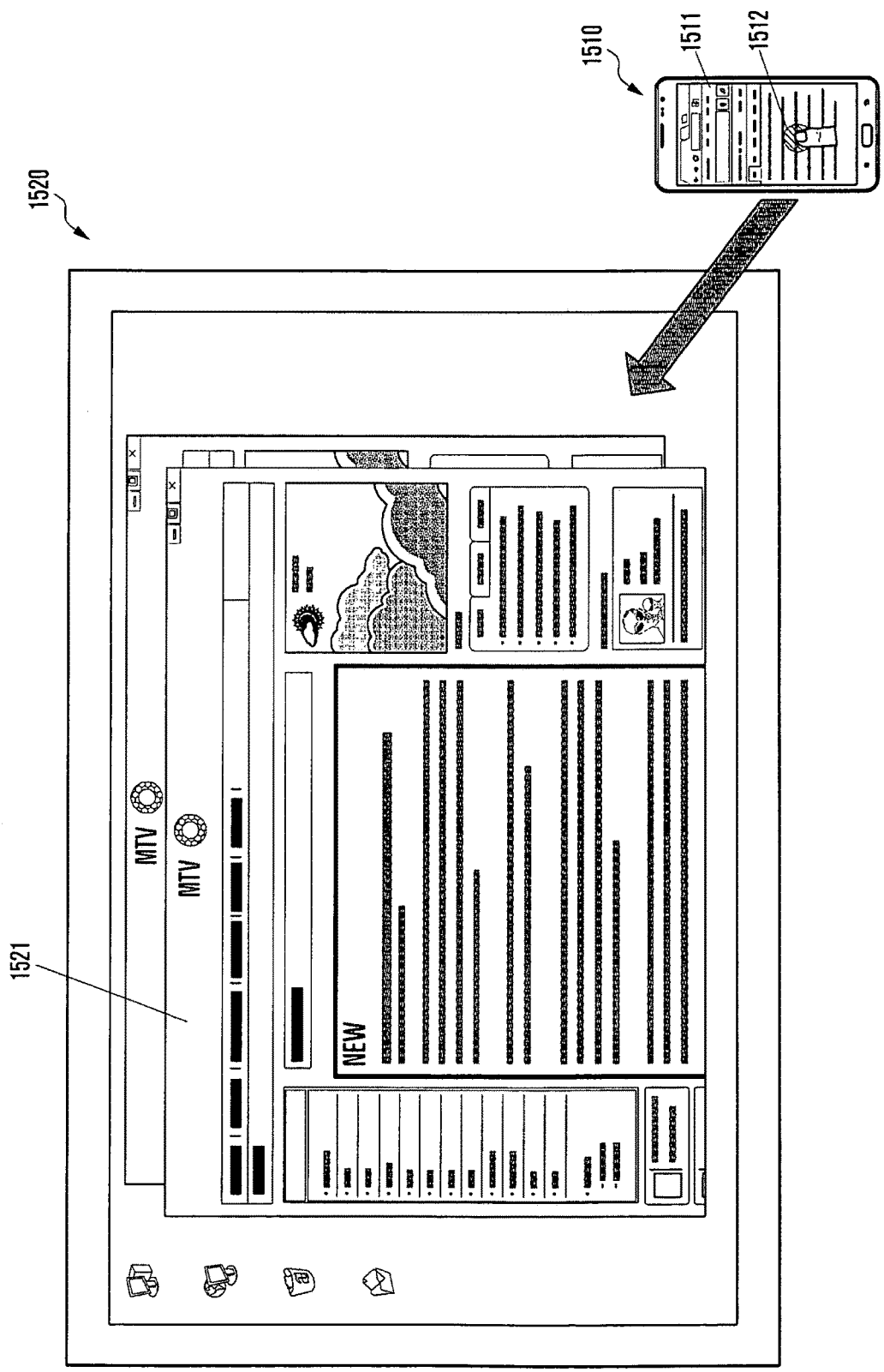
FIG. 15 is a view describing an example of an automatic division control of a browser according to an embodiment of the present disclosure.

FIG. 15 is a view describing an example of an automatic division control of a browser according to an embodiment of the present disclosure.

Referring to FIG. 15, a smart phone 1510 executes a web browser and displays a webpage 1511 as a result thereof. At this time, the user makes a tap 1512 on a link displayed on a screen of the smart phone 1510. Then, the smart phone 1510 detects the tap 1512 on the link and transmits link information to a smart TV 1520 in response to the tap. The smart TV 1520 executes the web browser in response to reception of the link information and displays a linked webpage 1521. As described, the smart phone 1510 may display, for example, a website of a potable site and webpages linked with the website may be displayed on the smart TV 1520.

Figure 16:
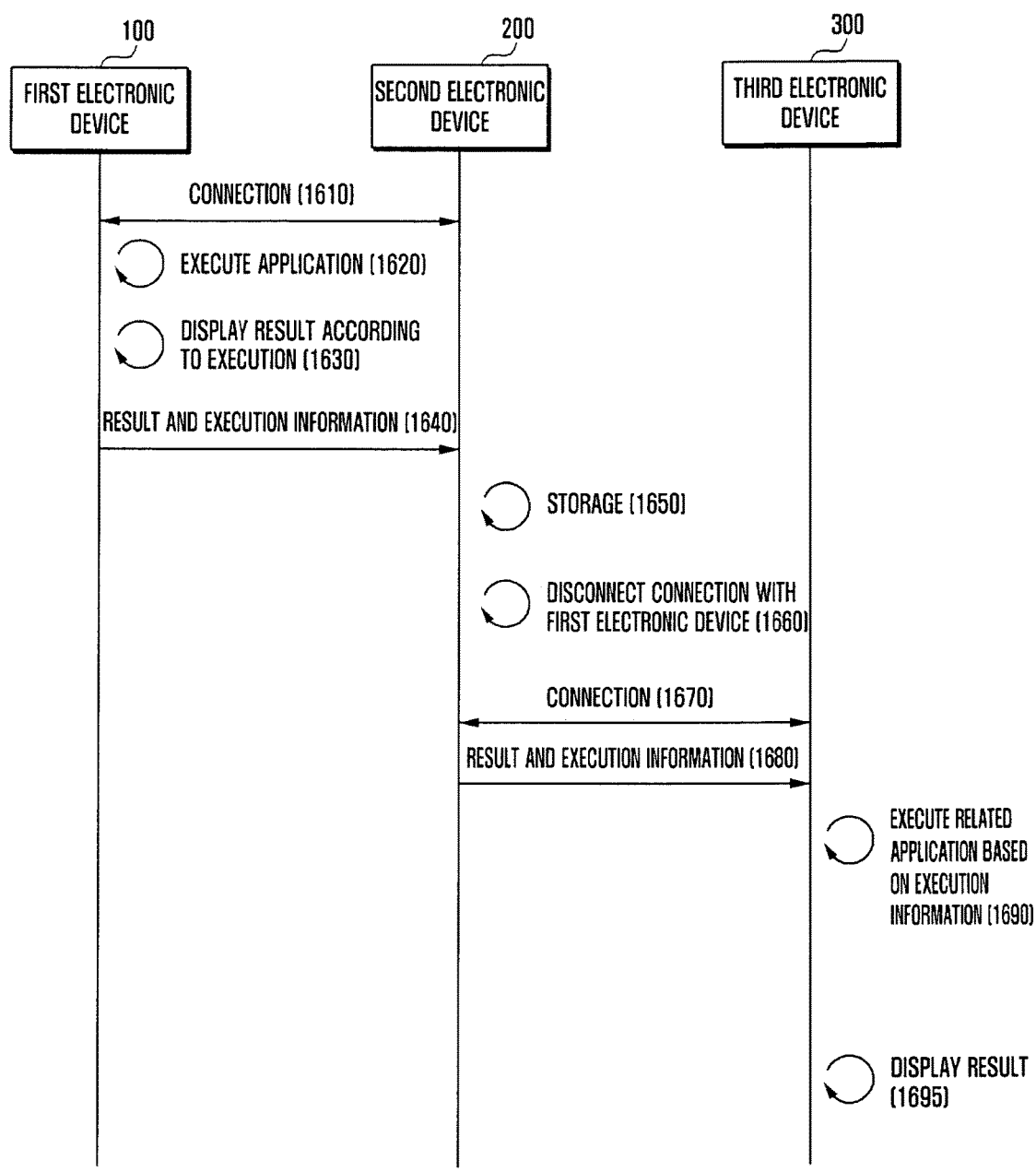
FIG. 16 is a flowchart describing a method of operating an APP operating system according to an embodiment of the present disclosure.

FIG. 16 is a flowchart describing a method of operating an APP operating system according to an embodiment of the present disclosure.

Referring to FIG. 16, according to various embodiments of the present disclosure, the APP operating system 10 may further include a third electronic device 300. The third electronic device 300 may have the same configuration as that of the first electronic device 100, and/or the second electronic device 200.

At operation 1610, the first electronic device 100 and the second electronic device 200 may perform a connection process.

At operation 1620, if the first electronic device 100 and the second electronic device 200 are connected to each other, the first electronic device 100 may execute an application in response to an application execution request.

At operation 1630, the first electronic device 100 may output (e.g., display) a result according to the execution of the application.

At operation 1640, during the execution of the application, the first electronic device 100 may transmit related execution information (e.g., Internet address, and/or the like) to the second electronic device 200 together with the output result (e.g., webpage). Meanwhile, when the result, the execution information, or both the result and the execution information are updated, the first electronic device 100 may transmit the updated information to the second electronic device 200. Such a transmission process may be performed whenever the result, the execution information, or both the result and the execution information are updated, or periodically.

At operation 1650, when receiving the result and the execution information thereof from the first electronic device 100 (e.g., in response to receiving the result and the execution information from the first electronic device 100), the second electronic device 200 may store the result and the execution information thereof. Thereafter, when updated information (e.g., result, execution information or both of them) is received, the pre-stored information is changed to the updated information.

At operation 1660, the second electronic device 200 may recognize that the connection with the first electronic device 100 is disconnected.

At operation 1670, the second electronic device 200 and the third electronic device 300 may perform a connection process.

At operation 1680, when the second electronic device 200 is connected with the third electronic device 300, the second electronic device 200 may transmit the stored result and execution information to the third electronic device 300.

At operation 1690, in response to reception of the result and the execution information, the third electronic device 300 executes a related application based on the received execution information.

At operation 1695, the third electronic device 300 outputs (e.g., displays) the received result. Alternatively, at operation 1695, the third electronic device 300 may generate a result based on the received execution information and output the generated result. For example, when the received execution information includes Internet address information or cookie information, the third electronic device 300 may access a website by using the information, receive a webpage from the website, and display the webpage.

An example using the system operating method described with reference to FIG. 16 will be discussed in the following description.

The user may attempt Internet banking by using a desktop PC (e.g., the first electronic device 100). At this time, the desktop PC may be connected to a smart phone (e.g., the second electronic device 200) of the user, and accordingly, information related to Internet banking (e.g., ID, password, Internet address information of the corresponding webpage, account number, transferred amount information, and/or the like) may be automatically transmitted to the smart phone. For example, the information related to Internet banking may be temporarily stored in the smart phone. However, if there is no accredited certificate of the user in the desktop PC, Internet banking may not be completed. Accordingly, the user may complete the incomplete work in a notebook PC (e.g., the third electronic device 300) having the accredited certificate installed therein. For example, the notebook PC may receive the information related to Internet banking from the smart phone and fully complete Internet banking by using the received information.

The method according to the present disclosure as described above may be implemented as a program command which can be executed through various computers and recorded in a non-transitory computer-readable recording medium. The non-transitory computer-readable recording medium may include a program command, a data file, and a data structure. The program command may be specially designed and configured for the present disclosure or may be used after being known to those skilled in computer software fields. The non-transitory computer-readable recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware devices such as a ROM, a RAM, a flash memory, and/or the like. Further, the program command includes a machine language code generated by a compiler and a high-level language code executable by a computer through an interpreter, and/or the like. The hardware devices may be configured to operate as one or more software modules to perform various embodiment of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   detecting a connection between the electronic device and an external device;
   detecting an external output request for outputting information associated with executed application in the electronic device to a display of the connected external device;

determining, in response to the external output request and the detected connection, whether the external device connected to the electronic device has a replacement application;

transmitting an execution request of the replacement application to the external device when it is determined that the external device has the replacement application; and receiving a message indicating that the external device does not have the replacement application when it is determined that the external device does not have the replacement application and transmitting a result according to the execution of the application to the external device in response to the receiving the message, wherein the execution request causes the external device to execute the replacement application in response to the execution request and to display the information by the execution of the replacement application.

2. The method of claim 1, further comprising:
detecting an execution termination request of the application;
transmitting an execution termination request of the replacement application to the external device in response to the execution termination request;
receiving execution information of the replacement application from the external device; and
storing the received execution information.

3. The method of claim 2, wherein the execution information includes at least one of data which can be processed by the application and Internet address information.

4. The method of claim 1, wherein the determining of whether the external device has a replacement application comprises:
transmitting identification information of the application to the external device; and
receiving a value indicating whether the replacement application has been installed in the external device.

5. The method of claim 1, wherein the transmitting of the execution request of the replacement application comprises:
transmitting at least one of data which can be processed by the replacement application and Internet address information.

6. A method of operating an electronic device having applications installed therein, the method comprising:
detecting a connection with an external device;
receiving, by the electronic device, an external output request and execution information from the external device, the execution information associated with an executed application in the external device;
selecting at least one application corresponding to the execution information in response to the external output request, when the application corresponding to the execution information is available;
executing the selected at least one application based on the execution information, when the application corresponding to the execution information is available;
displaying the execution information by the execution of the selected at least one application, when the application corresponding to the execution information is executed;
transmitting to the external device a message indicating that the electronic device does not have the application corresponding to the execution available, when the application corresponding to the execution information is not available; and receiving a result of the executed application from the external device.

7. The method of claim 6, wherein the executing of the selected application comprises:
logging in to a website by using cookie information when the execution information includes the cookie information.

8. The method of claim 7, further comprising:
in response to a logout from the website, transmitting a message informing of the logout to the external device.

9. The method of claim 6, wherein the displaying of the execution information comprises:
accessing, if the execution information includes Internet address information, websites corresponding to the Internet address information;
receiving webpages from the respective accessed websites; and
displaying one or more of the webpages.

10. The method of claim 6, wherein the displaying of the execution information comprises:
changing, if the execution information includes Internet address information, the Internet address information to be suitable for an environment of the electronic device;
accessing a website corresponding to the changed Internet address information;
receiving a webpage from the accessed website; and
displaying the received webpage.

11. The method of claim 6, wherein the selecting of the one or more of the applications comprises:
selecting one or more web browsers if the execution information includes Internet address information.

12. The method of claim 6, wherein the executing of the selected application comprises:
executing the selected application when a connection with the external device is disconnected.

13. The method of claim 6, wherein the executing of the selected application comprises:
receiving a webpage from the website by using link information if the execution information includes the link information.

14. The method of claim 6, further comprising:
transmitting the execution information received from the external device to a second external device when a connection with the second external device is made.

15. An electronic device comprising:
an input device;
a memory configured to store an application;
a connector configured to connect with an external device; and
at least one processor configured to control the memory and the connector,
wherein the at least one processor is configured to:
detect a connection with the external device,
detect an execution request for outputting information associated with an executed application in the electronic device to a display of the connected external device from the input device,
determine, in response to the execution request, whether the external device has a replacement application,
control to the connector to transmit an execution request of the replacement application to the external device when it is determined that the external device has the replacement application, and
receive a message indicating that the external device does not have the replacement application when it is determined that the external device does not have the replacement application and transmit a result according to the execution of the application to the external device in response to the receive the message, wherein the at least one processor is configured to execute the replacement application in response to the execution request and to display the information by the execution of the replacement application.

16. The electronic device of claim 15, wherein the at least one processor is configured to:
   detect an execution termination request of the application from the input device,
   transmit an execution termination request of the replacement application to the external device in response to the execution termination request,
   receive execution information of the replacement application from the external device, and
   store the received execution information.

17. The electronic device of claim 16, wherein the execution information includes at least one of data which can be processed by the application and Internet address information.

18. The electronic device of claim 15, wherein the at least one processor is configured to:
   control the connector to transmit identification information of the application to the external device,
   receive a value indicating whether the replacement application has been installed in the external device from the external device through the connector, and
   determine whether the replacement application has been installed in the external device by using the value.

* * * * *